(12) United States Patent
Yanase et al.

(10) Patent No.: US 8,654,117 B2
(45) Date of Patent: Feb. 18, 2014

(54) DISPLAY DEVICE, LIQUID CRYSTAL DISPLAY DEVICE, ELECTRONIC APPARATUS, AND DISPLAY DEVICE MANUFACTURING METHOD

(75) Inventors: Jiro Yanase, Kawasaki (JP); Hiroshi Haga, Kawasaki (JP)

(73) Assignee: NLT Technologies, Ltd., Kanagawa (JP)

(*) Notice: Subject to any disclaimer, the term of this patent is extended or adjusted under 35 U.S.C. 154(b) by 436 days.

(21) Appl. No.: 12/417,255

(22) Filed: Apr. 2, 2009

(65) Prior Publication Data

US 2009/0256820 A1   Oct. 15, 2009

(30) Foreign Application Priority Data

Apr. 9, 2008   (JP) .................................. 2008-101967

(51) Int. Cl.
G06F 3/045   (2006.01)
(52) U.S. Cl.
USPC ............................ 345/345; 345/173; 345/175
(58) Field of Classification Search
None
See application file for complete search history.

(56) References Cited

U.S. PATENT DOCUMENTS

| | | | |
|---|---|---|---|
| 2005/0184965 A1* | 8/2005 | Geaghan et al. | 345/173 |
| 2006/0011979 A1* | 1/2006 | Moriwaki | 257/347 |
| 2006/0081846 A1* | 4/2006 | Yamazaki et al. | 257/59 |
| 2006/0274055 A1* | 12/2006 | Reynolds et al. | 345/174 |
| 2008/0122802 A1* | 5/2008 | Furuhashi et al. | 345/174 |

FOREIGN PATENT DOCUMENTS

| | | |
|---|---|---|
| JP | 56-500230 A | 2/1981 |
| JP | 2000081610 A | 3/2000 |
| JP | 2000105670 A | 4/2000 |
| JP | 3121592 B2 | 10/2000 |
| JP | 2002-108233 A | 4/2002 |
| JP | 2003-066417 A | 3/2003 |
| JP | 2003-099192 A | 4/2003 |
| JP | 2006259485 A | 9/2006 |
| JP | 2007102377 A | 4/2007 |
| JP | 2007207124 A | 8/2007 |
| JP | 2007524174 A | 8/2007 |
| JP | 2007334606 A | 12/2007 |
| JP | 2008009750 A | 11/2008 |
| JP | 2009042899 A | 2/2009 |

OTHER PUBLICATIONS

Yuji Mitani, "Technologies and Developments of Touchpanels," CMC Publishing Co., Ltd., Dec. 1, 2004, pp. 54-64.
Office Action issued by the Japanese Patent Office corresponding to Japanese Patent Application No. 2013036817, dated Sep. 24, 2013.

* cited by examiner

Primary Examiner — Joseph Haley
Assistant Examiner — Ifedayo Iluyomade
(74) Attorney, Agent, or Firm — Sughrue Mion, PLLC

(57) ABSTRACT

To provide a low-cost display device which can accurately detect a position touched by a finger. A display device displays an image by having display elements capable of performing electro-optic responses formed between conductible first and second substrates, and detects a contact position touched by a contact body by having a conductive impedance surface formed on the second substrate side. The display device includes: linearization pattern sections formed on the first substrate, which include a plurality of electrodes capable of detecting electric currents on a conductive impedance surface; and a conductive member which electrically connects the linearization pattern sections with the conductive impedance surface on the second substrate.

18 Claims, 19 Drawing Sheets

DISPLAY DEVICE, LIQUID CRYSTAL DISPLAY DEVICE, ELECTRONIC APPARATUS, AND DISPLAY DEVICE MANUFACTURING METHOD

CROSS-REFERENCE TO RELATED APPLICATION

This application is based upon and claims the benefit of priority from Japanese patent application No. 2008-101967, filed on Apr. 9, 2008, the disclosure of which is incorporated herein in its entirety by reference.

BACKGROUND OF THE INVENTION

1. Field of the Invention

The present invention relates to a display device, a liquid crystal display device, an electronic apparatus, and a display device manufacturing method. More specifically, the present invention relates to a display device and the like provided with a touch sensor that is capable of detecting positions touched by a finger or a pen.

2. Description of the Related Art

A touch sensor is a device for detecting positions touched by a finger or a pen, and it is normally used in combination with a display device such as a liquid crystal display device (LCD), a plasma display device (PDP), or the like.

The touch sensor is utilized to one of man-to-machine interfaces, such as a keyboard, a mouse, and the like of a computer. The output signals of the touch sensor are generated by touching directly prescribed positions such as button images on a screen of a display device with a contact body such as a human finger or a pen to the computer and the output signals control an apparatus or to control display contents of the display device. The display with the touch sensor (hereinafter referred to as a touch panel) are currently put into practical use in portable information terminals, ticket-vending machines, automated teller machines (ATM), car navigation systems, copying machines, and the like.

An analog capacitance coupling type, a resistance film type, an infrared type, an ultrasonic type, and an electromagnetic inducing type are known as the types of the touch sensor. Among those, the analog capacitance coupling type is further classified into a projected capacitive type and a surface capacitive type.

The surface capacitive type touch sensor is configured with a transparent substrate, a uniform transparent conductive film formed thereon, and a thin insulating film formed thereon.

When driving the touch sensor, an AC voltage is applied from the four corners of the transparent conductive film. When the touch sensor is touched by a finger, a small electric current is flown in the finger because of a capacitance formed between the touched surface and the finger. The electric currents flow from each corner of the film to the touched point.

Then, a controller obtains the ratio of the electric currents from each corner and calculates the coordinates of the touched position. Regarding the technique of the surface capacitive type touch sensor, Japanese Examined Patent Publication 56-500230 (Patent Document 1) discloses a basic concept device.

However, when the AC voltages are simply applied to the transparent conductive film from the four corners, an electric field lines distributed on the transparent conductive film becomes curved and non-linear. Therefore, the touched positions by a finger or a pen cannot be detected accurately.

Techniques for overcoming such issue are disclosed in Patent Document 1 and Japanese Patent No. 3121592 (Patent Document 2).

Those Documents mention about linearization patterns provided on the outer periphery of a transparent conductive film. An electric field is extended from the linearization pattern provided in each side of the outer periphery towards the counter side, and the electric field intensity becomes constant in a direction perpendicular to the respective sides of the outer periphery. That is, regarding the potential distribution on the transparent conductive film, equipotential lines in parallel to each side of the outer periphery are formed, and the pitches of the equipotential lines become uniform and linear. Therefore, the relation between the potential distribution on the transparent conductive film and the corresponding finger touched positions can be simplified.

Patent Document 1 discloses a structure which superimposes conductive segments on a resistive surface (referred to a conductive impedance surface hereinafter) by silk screening printing technique (from the seventh line to the twelfth line of lower left section of p. 5 of Patent Document 1, and FIG. 5 of Patent Document 1).

Further, also disclosed is an example which arranges conductive segments in a geometric pattern, and repeatedly corrects the system of an isochrone equation showing the resistance net between the segments to obtain the optimum geometric shape (from the thirteenth line to the eighteenth line of lower left section of p. 5 of Patent Document 1, and FIG. 6 of Patent Document 1).

With the above, the degrees of the current density and the directions thereof at any points on a plane become uniform on the conductive impedance surface, thereby providing a resistive surface which generates linear electric fields.

Further, Patent Document 2 discloses an example which provides linearization patterns along the edges of a position detecting conductive film (hereinafter referred to as a position detecting film) of a counter substrate side for making electric field lines uniform (paragraph 0017 of Patent Document 2, FIG. 5 of Patent Document 2). Further, in the example of Patent Document 2, a layer of a position detecting film is formed on the counter substrate, and a layer of linearization patterns is further formed on the layer of the position detecting film (FIG. 7 of Patent Document 2).

In the meantime, the latest technology trends regarding the analog capacitance coupling type are disclosed in "Technologies and Developments of Touch Panels" supervised by Yuji MITANI, CMC publishing CO., LTD. Dec. 1, 2004, pages. 54-64 (Non-Patent Document 1). For the touch sensor of the analog capacitance coupling type of a related technique, a touch sensor of a surface capacitive type formed on a transparent substrate is attached on a display device to be used.

However, such structure has the touch sensor provided further on the display screen, so that there are some issues to be overcome, e.g., an increase in the thickness of the device itself, an increase in the cost, and deterioration of the display quality by putting the touch sensor on the display. Techniques for overcoming such issues are disclosed in Japanese Unexamined Patent Publication 2003-99192 (Patent Document 3) and Japanese Unexamined Patent Publication 2003-66417 (Patent Document 4).

Patent Document 3 discloses a device which calculates position coordinates of a touched position based on electric currents at the four corners by having current detectors provided the four corners on a counter electrode surface which applies voltages to a liquid crystal.

Patent Document 4 discloses a device which includes: a liquid crystal display (LCD) circuit for supplying display voltages or currents to a transparent conductive film; a position detecting circuit for detecting electric currents flown from a plurality of points of the transparent conductive film; and a switching circuit for making a counter electrode and one of those circuits electrically conductive.

Further, Patent Document 4 discloses an example which uses the counter electrode surface to function as a position detecting conductive film (transparent conductive film) (0030 of Patent Document 4), and position detecting electrodes for detecting positions of applied voltages are formed at the four corners of the position detecting conductive film. Furthermore, Patent Document 4 discloses an example which forms a plurality of position detecting electrodes along the periphery of the counter electrode surface.

With the techniques of Patent Documents 3 and 4, the common (COM) electrode or the transparent conductive film for LCD drive circuit functions as the transparent conductive film of the surface capacitive type touch sensor, so that it is unnecessary to additionally provide a surface capacitive type touch sensor to the display device. As a result, it is possible to overcome the issues such as an increase in the thickness of the device itself, an increase in the cost, and deterioration of the display quality.

However, there are still remained issues with the display devices disclosed in Patent Documents 3 and 4 as follows.

That is, while Patent Documents 3 and 4 are described to utilize the counter electrode surface as the transparent conductive film for detecting positions in order to overcome the issues such as the increases in the thickness of the device itself and the cost, there is no depiction about a specified structure and method for forming the linearization patterns.

Therefore, the display devices disclosed in Patent Documents 3 and 4 are suited for reducing the weight, the size, and the thickness, but not capable of correctly detecting the positions touched by a finger or a pen.

In the meantime, the method for forming the linearization patterns according to the related technique is a screen printing of a conductive paste, etc., as depicted in Patent Document 2. For such method, it is necessary to add a step for forming the linearization patterns, and to provide a special manufacturing device such as a screen printing device.

Further, the conductive paste for the linearization patterns is normally made with fine powders of noble metals such as silver, so that such expensive material is required.

As a result, the cost for manufacturing the display devices is increased if the techniques of Patent Documents 3 and 4 and the technique of Patent Document 2 are simply combined in order to form the linearization patterns on the counter electrode.

SUMMARY OF THE INVENTION

The present invention has been designed to overcome the issues of the above-described techniques. It is therefore an exemplary object of the invention to provide a display device and the like, which can detect the touched positions correctly and can be formed in small and thin type at a low cost.

In order to achieve the foregoing exemplary object, the display device according to an exemplary aspect of the invention is a display device which displays an image by a plurality of display drive elements capable of performing electro-optic responses of liquid crystal sealed between a first and a second substrates. The display device includes:

the first substrate, on which linearization pattern sections, a control part of the display drive elements, and their wirings are formed;

the second substrate which has a conductive impedance surface formed thereon, measures electric current values flown between a plurality of points and a touched point by a contact body and detect a contact position; the first substrate opposing against the conductive impedance surface on the second substrate, on which linearization pattern sections, a control part of the display drive elements, and their wirings are formed;

and an electrical conductive member which electrically connects the linearization pattern sections and the conductive impedance surface.

The display device manufacturing method according to another exemplary aspect of the invention is a manufacturing method of a display device that is capable of displaying an image by having display elements (pixels) capable of performing electro-optic responses formed between first and second substrates, including:

a first step which performs to form linearization pattern sections including a plurality of their electrodes in a peripheral area of a pixel matrix part on the first substrate, simultaneously with a step for forming a plural of pixel electrodes on the first substrate or a step for forming wirings on the first substrate;

a second step which forms, on the second substrate, a counter electrode functioning as the conductive impedance surface; and a third step which forms a conductive member between the linearization pattern sections and the counter electrode, which are capable of performing linearization of electric fields of the conductive impedance surface and capable of detecting electric currents on the conductive impedance surface.

DETAILED DESCRIPTION OF THE EXEMPLARY EMBODIMENTS

Hereinafter, an example of exemplary embodiments of the invention will be described in a concretive manner by referring to the accompanying drawings.

First Exemplary Embodiment (Overall Structure of Display Device)

Figure 1:
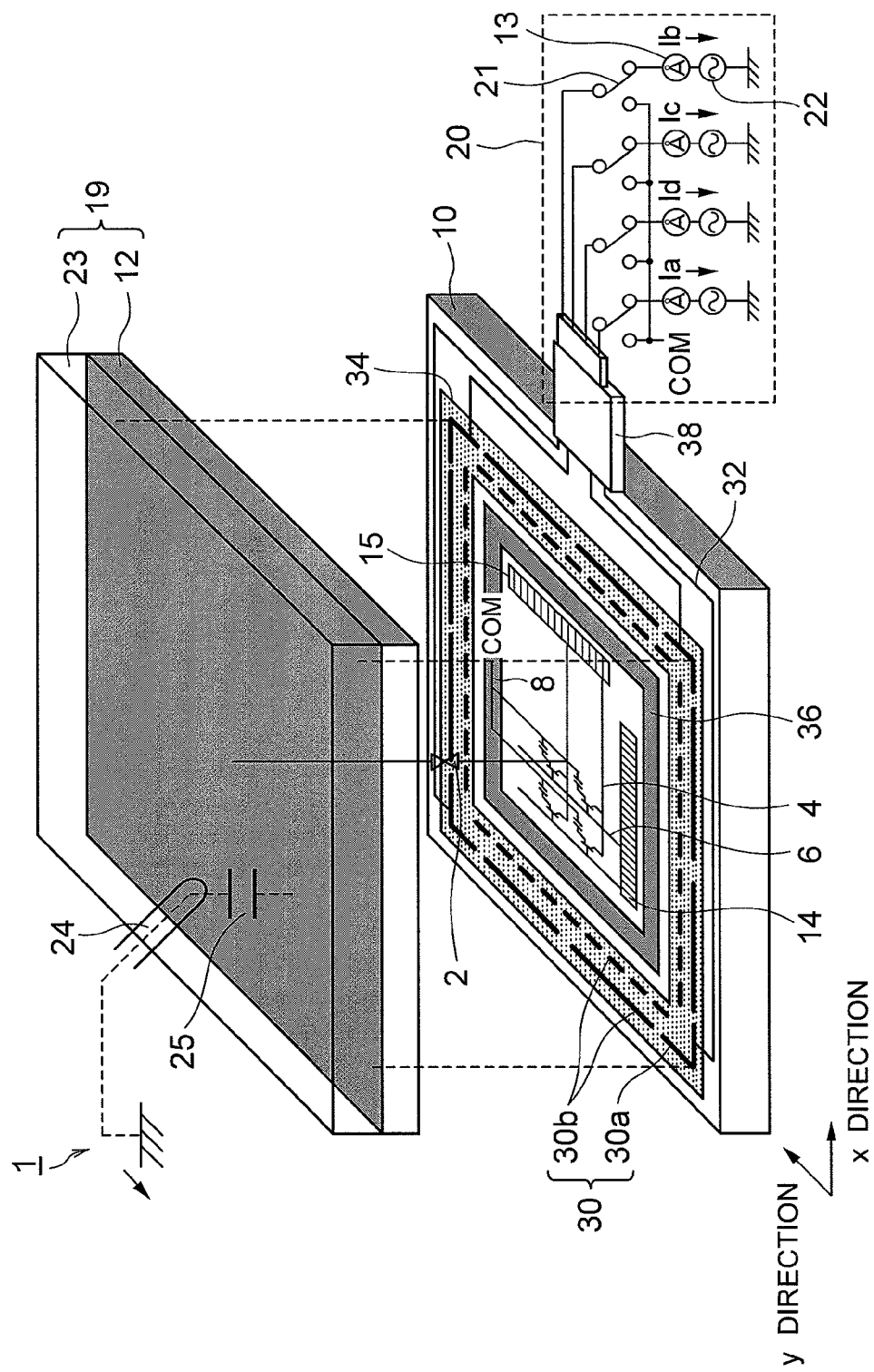
FIG. 1 is a perspective view showing an example of a schematic structure of a display device according to a first exemplary embodiment of the invention.

First, a specific structure of a display device according to this exemplary embodiment will be described in order from the overall structure to the detailed structure of each part. FIG. 1 is a perspective view showing an example of an overall schematic structure, which schematically illustrates a display device with a built-in touch sensor according to a first exemplary embodiment of the invention.

As shown in FIG. 1, a display device 1 of this exemplary embodiment is a liquid crystal display device (LCD) which includes a touch sensor that is capable of detecting touches of a finger or a pen on a display screen and position coordinates thereof.

Other than the liquid crystal display device, the display device 1 can also be a display device such as a plasma display device (PDP), an organic EL display device, or the like.

The display device 1 is configured, including a display device substrate 10, a counter substrate 19, and a polarizing plate (not shown).

The display device substrate 10 is a substrate on which electrodes (correspond to signal lines (signal electrodes) 4, scanning lines (scanning electrodes) 6, storage capacitance lines (storage capacitance electrodes) 8 of FIG. 1) for supplying electric signals to a liquid crystal 2 as an example of display element in a display area are formed. A pixel matrix part is formed in the display area on the surface of the display device substrate 10 opposing to the counter substrate 19 side. The pixel matrix part is configured with a plurality of signal lines (reference numeral 4 in FIG. 1), a plurality of scanning lines (reference numerals 6 in FIG. 1) crossing with the signal lines, storage capacitance lines (reference numeral 8 in FIG. 1) provided between the scanning lines, and pixel circuits arranged by corresponding to each intersection point.

The pixel circuit has a pixel switch TFT (Thin Film Transistor), a storage capacitance, and a pixel electrode. In the pixel switch TFT (switching element), the scanning line 6 for controlling on/off of the TFT is connected to a gate electrode, the signal line 4 for supplying signals to the pixel electrode is connected to either a drain electrode or a source electrode of the TFT, and the storage capacitance and the pixel electrode are connected to the remainder (the drain electrode or the source electrode). The storage capacitance is connected to the corresponding storage capacitance line 8.

FIG. 1 schematically shows a case having two each of scanning lines 6 and signal lines 4. However, the pixel circuit can be designed arbitrarily.

A scanning line driving circuit 14, a signal line driving circuit 15, and a storage capacitance line driving circuit (not shown) for driving the pixel matrix part are provided in the outer peripheral part of the display area in the display device substrate 10. The scanning line driving circuit 14 is a circuit for driving the scanning lines 6.

The signal line driving circuit 15 is a circuit for driving the signal lines 4. The storage capacitance line driving circuit is a circuit for supplying voltage signals to the storage capacitance line 8, and it is connected to a COM electrode.

Note here that a "display element control part" can be configured with the pixel circuit, the scanning line driving circuit 14, the signal line driving circuit 15, the storage capacitance line driving circuit, and the like. Further, the signal lines 4, the scanning lines 6, the storage capacitance lines 8, and the like can simply be referred to as "wirings" (driving wirings). Furthermore, the driving wirings together with touched-position detecting wirings described later can be referred to as "wirings", or either one of the wirings can be referred to as "wirings" as well.

Linearization pattern sections 30 are provided in a peripheral area of the outer peripheral part of the display area of the display device substrate 10.

Reference numerals of the linearization pattern sections will be defined here. In FIG. 1, the whole pattern painted black is generally referred to as the linearization pattern sections 30. Among those, four linearization pattern sections provided in the vicinity of the four corners (corner areas) connected to wirings 32 (touched-position detecting wirings) which configure a wiring part are defined as 30a (first pattern sections), and other linearization pattern sections provided on the four sides of the outer periphery (side areas) are defined as 30b (second pattern sections).

Figure 2:
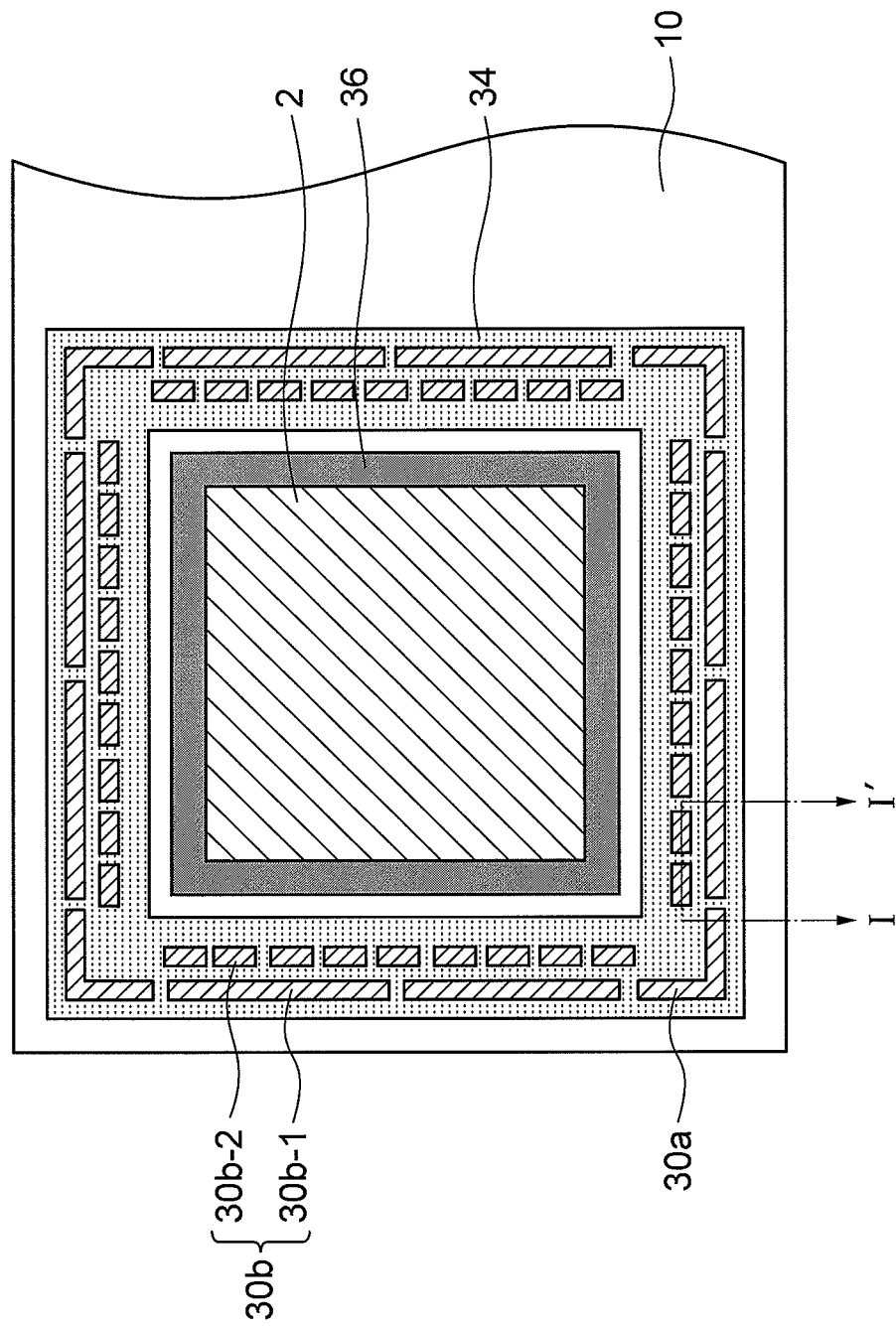
FIG. 2 is a plan model illustration showing an example of a schematic structure which illustrates a relation between linearization pattern sections and an anisotropic conductor of the display device according to the first exemplary embodiment of the invention.

As shown in FIG. 2, the linearization pattern sections 30b (second pattern sections) further include longer outer-periphery side patterns 30b-1 on the outer-periphery side and shorter inner-periphery side patterns 30b-2 on the inner-periphery side.

Furthermore, the linearization pattern sections 30a (first pattern section) are not limited to be formed in the four corners but may be formed at least two or more corners.

Each of the linearization pattern sections 30a provided in the vicinity of the four corners of the display device substrate 10 is connected to a crimp contact (not shown) of an FPC (flexible printed circuit) 38 via the wirings 32 connected thereto.

The crimp contact of the FPC is connected to an external substrate 20 (a control circuit substrate capable of loading a control circuit and the like) via the FPC 38, and it is electrically connected to a single-pole double-throw type switch 21 of the external substrate 20.

The switch 21 has an AC voltage source 22 electrically connected to one of the connections thereof via a current detecting circuit 13, and has the storage capacitance line circuit electrically connected to the other connection via the COM terminal (not shown).

The current detecting circuit 13 detects the electric current flown in the transparent conductive film 12 during a position detecting period. Signals regarding the electric currents detected by the current detecting circuit 13 are outputted towards a position detecting circuit (not shown). The position detecting circuit determines a touched position touched by a finger (contact mean) 24 on the glass substrate 23 based on the output signals from the current detecting circuit 13.

The AC voltage source 22 supplies AC voltages to the transparent conductive film 12 via the corresponding current detecting circuit and the linearization pattern 30a.

Figure 3:
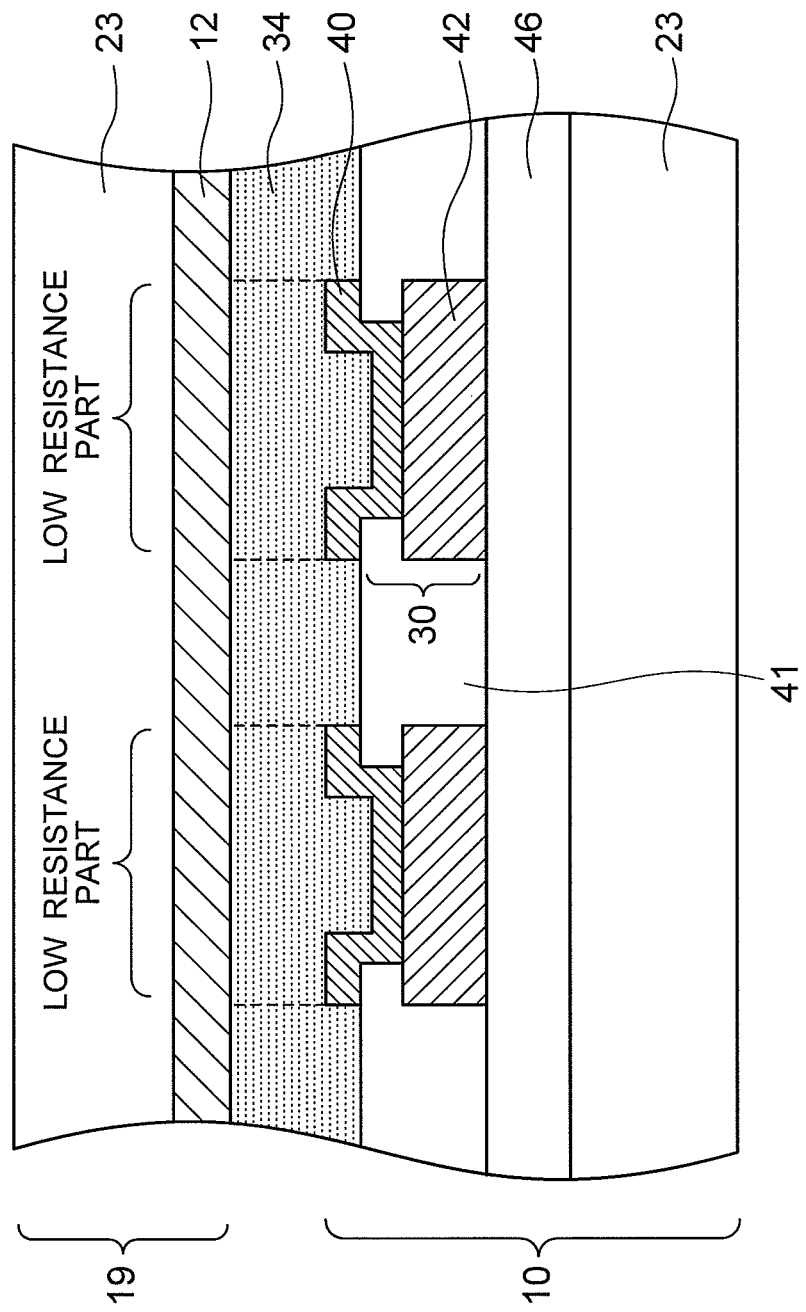
FIG. 3 is a fragmentary sectional view showing an I-I' part of FIG. 2.

FIG. 2 is a plan model illustration showing a relation between the linearization pattern sections and an anisotropic conductor according to the first exemplary embodiment of the invention. FIG. 3 is a fragmentary sectional view taken along I-I' line of FIG. 2. In all the drawings, it is assumed that the plan model illustrations are viewed from the counter substrate (front face of the display device) side.

However note that the plan model illustration of FIG. 2 does not contain a counter substrate, and the fragmentary sectional view of FIG. 3 contains a counter substrate. In the drawings of FIG. 2 and thereafter, the structures other than the linearization pattern sections 30 are omitted appropriately unless there is any specific notification, in order to provide explanations by specifically placing the emphasis on the relation between the linearization pattern sections 30 and the display device as well as the features of the exemplary embodiment.

Referring to the plan model illustration of FIG. 2 and the fragmentary sectional view of FIG. 3, an anisotropic conductor 34 as an example of a conductive member is formed between the transparent conductive film 12 and the linearization pattern sections 30 on the display device substrate 10. This anisotropic conductor 34 electrically connects the linearization pattern sections 30 on the display device substrate 10 with the transparent conductive film 12 (configures an conductive impedance surface). The pattern of the anisotropic conductor 34 is formed in a frame shape so as to cover the whole linearization pattern sections 30 provided in the outer peripheral area of the display device substrate 10.

The anisotropic conductor 34 is an insulating adhesive in which particles of a metal such as nickel or fine particles obtained by coating a metal such as nickel or gold to plastics are dispersed. When the anisotropic conductor 34 is inserted between the electrodes of two substrates, and heat/pressure is applied thereto, the metal particles of the anisotropic conductor 34 electrically connect each of the electrodes. This makes it possible to connect the electrodes on the top and bottom electrically, to insulate the neighboring pixels, and to couple the top and bottom electrodes adhesively.

Figure 5:
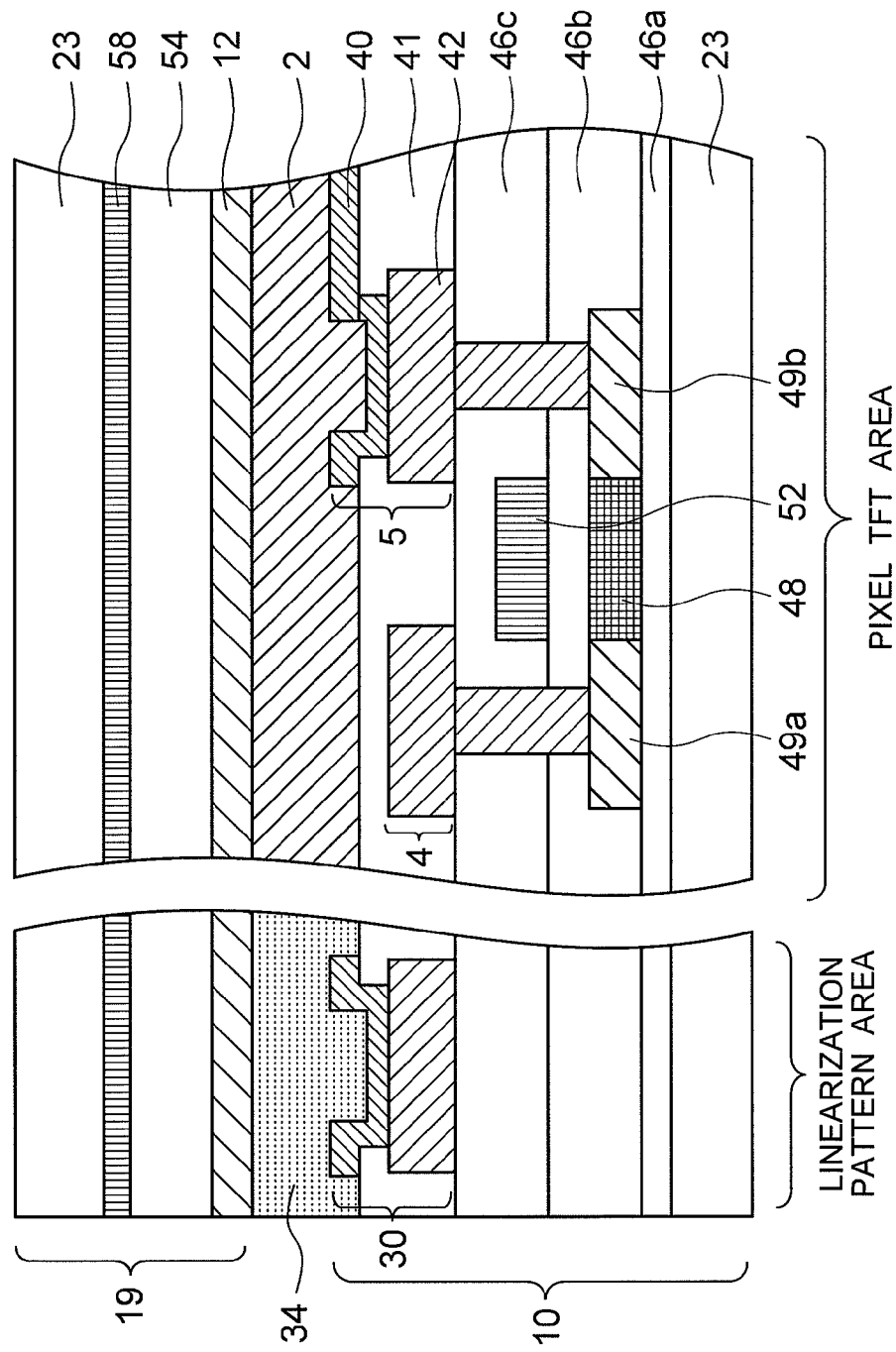
FIG. 5 is a sectional view which schematically shows an example of a schematic structure of the display device according to the first exemplary embodiment of the invention.

As will be described later by referring to FIG. 5, the linearization pattern sections 30 are formed with a same layer as the pixel electrode 5. As shown in FIG. 5, the pixel electrode 5 comprises a laminated layer "ITO 40/AL 42" that is formed with AL (aluminum) 42 and an ITO (indium tin oxide: transparent conductive film) 40 stacked on the AL (aluminum) 42, for example.

Similarly, as shown in FIG. 3, the linearization pattern sections 30 comprise a laminated layer "ITO 40/AL 42" that is formed with the AL (aluminum) 42 and the ITO (transparent conductive film) 40 stacked on the AL (aluminum) 42, for example.

Now, effects of a partial resistance decrease in the transparent conductive film achieved by the linearization pattern sections 30 will be described.

In general, the resistance of the area with the linearization pattern section 30 is lower than the resistance of the transparent conductive film which configures the impedance surface (low resistance part shown in FIG. 3).

The resistance of the area with the linearization pattern section can be considered as a synthesized resistance in which the resistance of the transparent conductive film and the resistance of the linearization pattern section are connected in parallel. Therefore, it becomes lower than the resistance of the transparent conductive film regardless of the extent of the resistance of the linearization pattern section.

In the meantime, the counter substrate 19 has a glass substrate 23 of the counter substrate 19, a color filter (not shown) formed on the surface of the liquid crystal 2 side, and the transparent conductive film 12 formed on the surface of the color filter on the liquid crystal 2 side. The transparent conductive film 12 is a counter electrode formed with ITO (indium tin oxide), which comprises a conductive impedance surface.

Further, a polarizing plate (not shown) is provided on outer surface of the glass substrate 23. The liquid crystal 2 is an example of a display element (pixel) capable of performing electro-optic response provided between the display device substrate 10 and the counter substrate 19. The liquid crystal 2 is sealed by a sealing device such as a sealing agent 36 that is an example of a seal.

The linearization pattern sections 30 (30a, 30b) can make distribution of electric field lines on the impedance surface uniform. Various kinds are designed as the linearization pattern sections 30, and FIG. 2 shows an example thereof. In the distribution of the electric field lines while ideal linearization can be achieved, straight equipotential lines can be distributed at equivalent intervals.

Now, the structure of the first exemplary embodiment shown in FIG. 2 is compared with the structure of a touch panel to which linearization pattern sections of a related technique depicted in Patent Document 2 or the like are provided.

Figure 18:
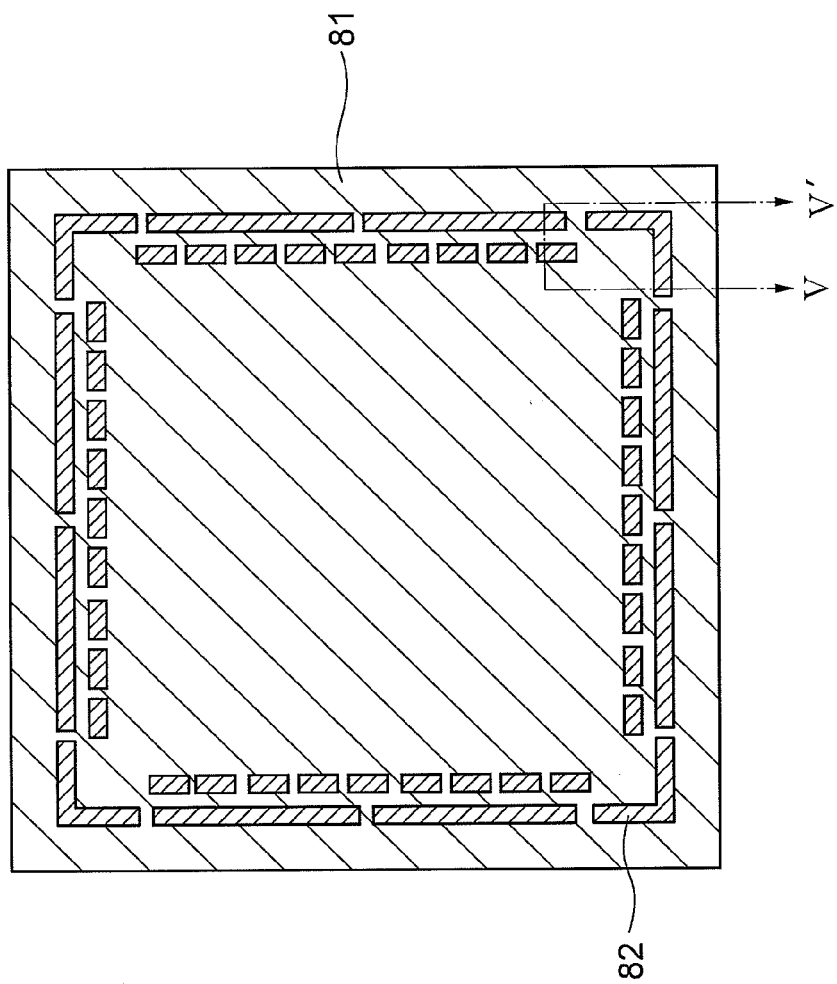
FIG. 18 is a plan model illustration showing an example of a touch panel to which linearization pattern sections according to a related technique are provided.
Figure 19:
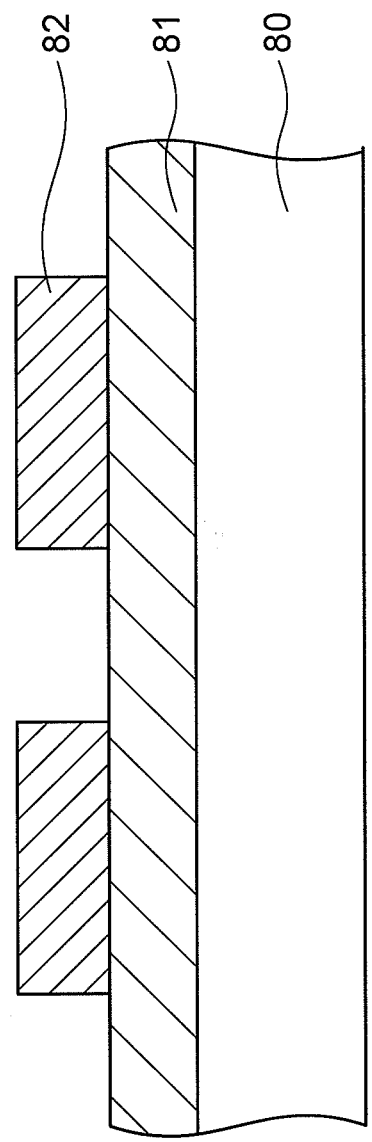
FIG. 19 is a fragmentary sectional view showing a V-V' part of FIG. 18.

FIG. 18 is a plan model illustration of a touch panel with a touch sensor to which the linearization pattern sections of the related technique are provided. FIG. 19 is a fragmentary sectional view along V-V' line of FIG. 18.

Referring to FIG. 18 and FIG. 19, a quartz substrate 80 as a counter substrate is covered by a transparent conductive film 81. Linearization pattern sections 82 formed with silver paste or the like are formed in the outer periphery on the transparent conductive film 81.

In the meantime, with the first exemplary embodiment shown in FIG. 2, the linearization pattern sections 30 are formed on the display device substrate 10 without an additional step in the display device substrate forming process.

And the conductive member is possible to reduce the resistance in a partial area of the opposing conductive impedance surface by having it corresponded to the pattern of the linearization pattern sections through electrically connecting the linearization pattern sections on the display device substrate and the conductive impedance surface of the counter substrate. It can be considered as if the linearization pattern sections formed on the display device substrate are projected upon the conductive impedance surface on the counter substrate.

The above arrangement is unnecessary to form the linearization pattern sections (reference numeral 82 in FIG. 18) on the transparent conductive film 12 of the counter substrate, since the linearization pattern sections 30 also function as those sections.

Therefore, it is possible to realize the same function of the linearization pattern sections upon the conductive impedance surface of the counter substrate without forming the linearization pattern sections on the counter substrate side.

Further, it is possible to decrease the resistance of a partial area of the impedance surface by corresponding to the shape of the linearization pattern. It can be considered as if the linearization pattern sections formed on the display device substrate are projected upon the conductive impedance surface.

Furthermore, areas used specifically for forming the linearization pattern sections on the counter substrate side become unnecessary.

FIG. 2 shows a simplified example of the linearization pattern sections 30. While the linearization pattern sections 30a, 30b of the display device 100 shown in FIG. 4 are more complicated than the pattern shown in FIG. 2, more uniform voltages can be supplied from the four sides of the outer periphery of the transparent conductive film 12.

Figure 4:
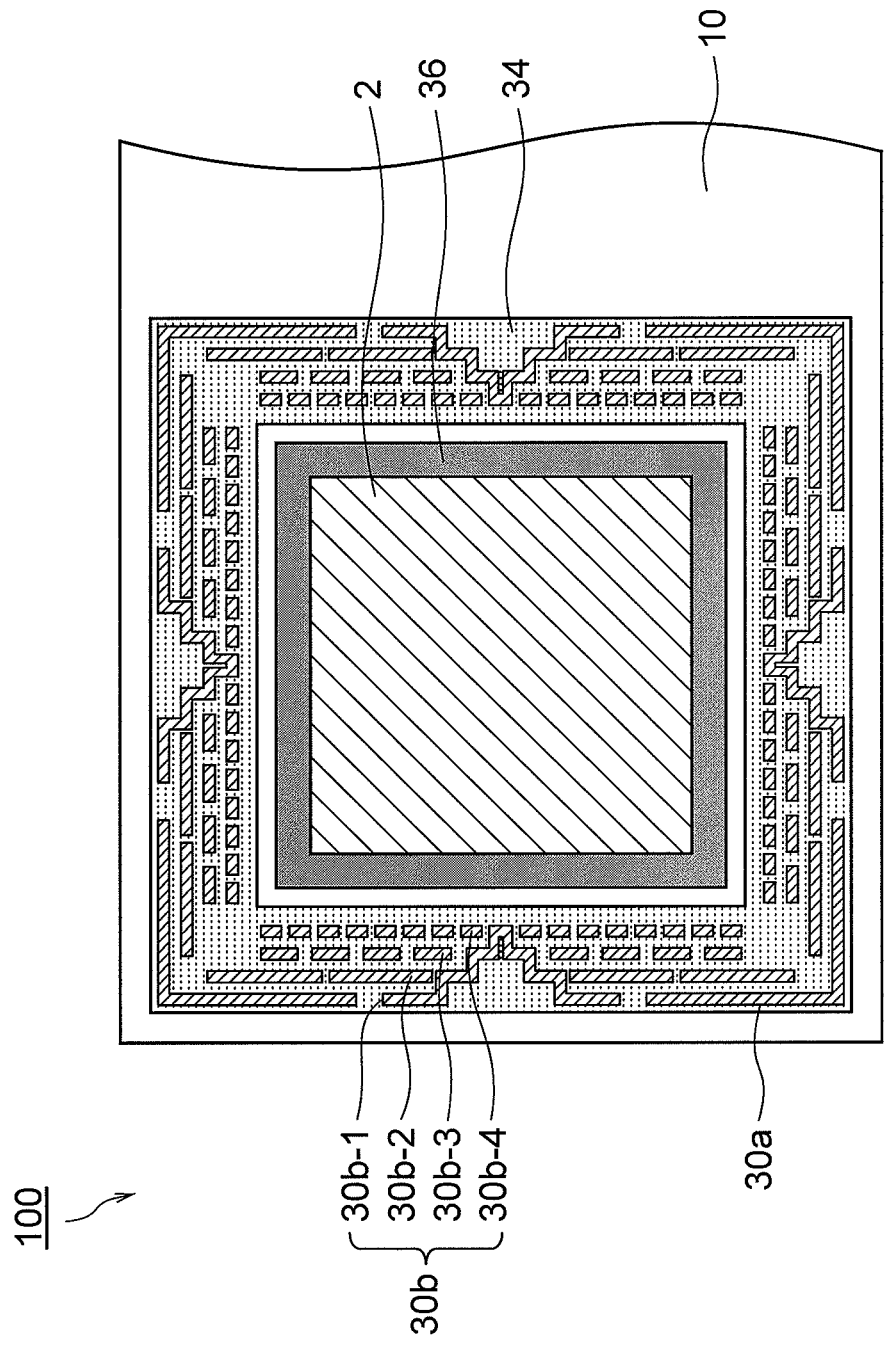
FIG. 4 is a plan model illustration showing an example of linearization pattern sections which can supply uniform voltages to four sides of outer periphery of a transparent conductive film according to the first exemplary embodiment of the invention.

Specifically, the linearization pattern sections 30b (second pattern sections) shown in FIG. 4 include first short inner-periphery side patterns 30b-4 on the inner-periphery side, second inner-periphery side patterns 30b-3 longer than the first inner-periphery side patterns 30b-4, third inner-periphery side patterns 30b-2 longer than the second inner-periphery side patterns 30b-3, and geometrical shape patterns 30b-1 of a specific geometrical shape extended along one end side of each pattern from the inner-periphery side towards the outer-periphery side. The linearization pattern sections 30a (first pattern sections) are formed by being extended long towards the center.

In the followings, explanations regarding operations will be provided by referring to the simplified structure of the linearization pattern sections 30 as in FIG. 2 except for the structure shown in FIG. 4.

(Operations)

Figure 6:
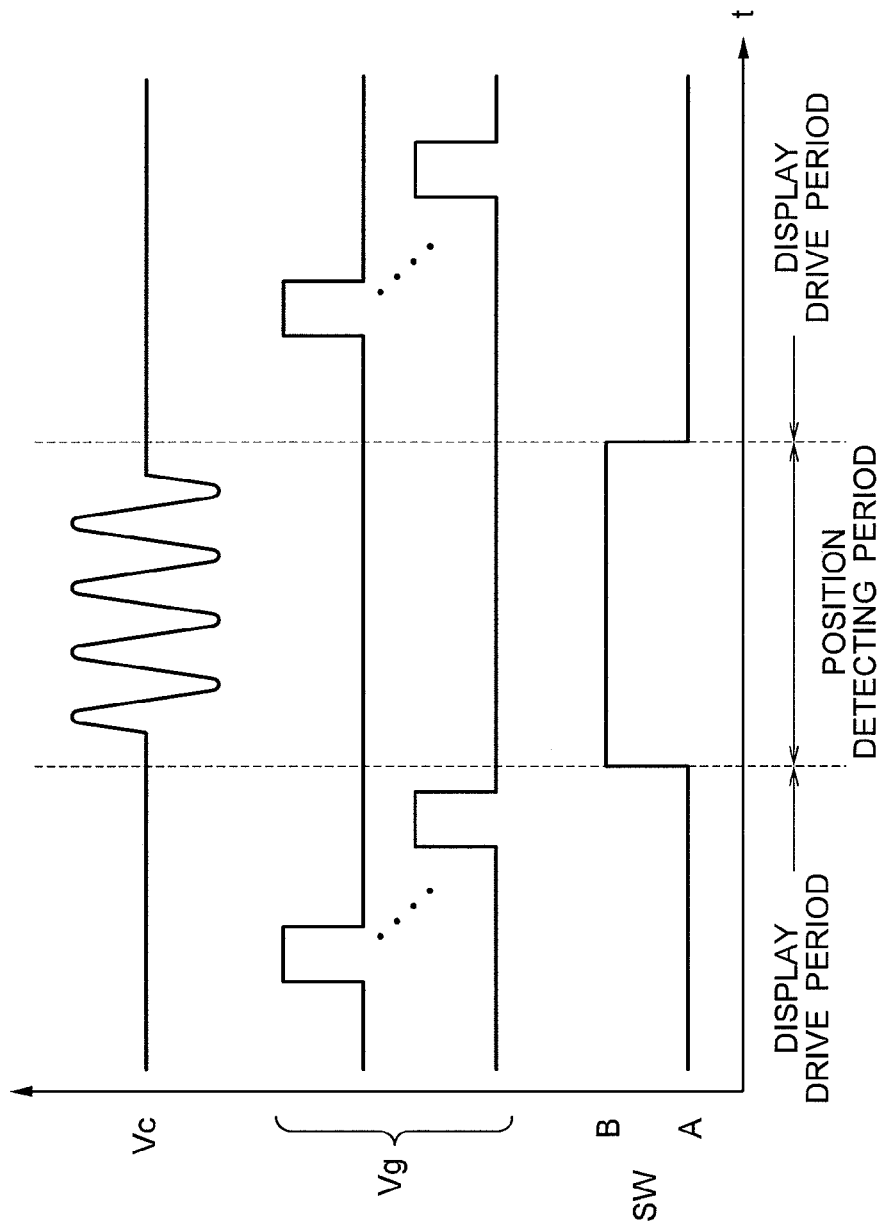
FIG. 6 is a timing chart which schematically shows a state of voltages of main electrodes of the display device according to the first exemplary embodiment of the invention.

Now, operations of the display device according to the first exemplary embodiment will be described by referring to FIG. 1 and FIG. 6. FIG. 6 is a timing chart which schematically shows a state of voltages of main electrodes of the display device according to the first exemplary embodiment of the present invention.

In FIG. 6, Vc is a voltage of the transparent conductive film (reference numeral 12 of FIG. 1), Vg is a voltage of the scanning line (reference numeral 6 of FIG. 1), and SW is a voltage of a control signal which determines the state of the switch (reference numeral 21 of FIG. 1). While FIG. 6 schematically shows a case of having two signal lines, the number thereof can be designed arbitrarily.

Regarding to drive the display device, the display device has two periods of a display drive period and a position detecting period. Those two periods are divided in terms of time base. The display drive period is a period for writing a voltage for achieving pixel to display an image. The position detecting period is a period where the current detecting circuit (reference numeral 13 of FIG. 1) detects the electric current in order to determine the position of a finger or a pen and to detect whether or not there is a pointing action.

A vertical blanking period is used for the position detecting period. The vertical blanking period is a period where the scanning operation using the scanning line (reference numeral 6 of FIG. 1) is not executed (FIG. 1 is referred for explanation). Further, the switch 21 connects the wiring 32 to the COM wiring in the display drive period. Meanwhile, in the position detecting period, the switch 21 is made conductive with the AC voltage source 22 side including the current detecting circuit 13. This state can be achieved by setting SW signal of FIG. 6 to B, i.e., by setting the SW signal to high level.

In such switch state (i.e., in the state of the switch 21 shown in FIG. 1), same-phase and same-potential AC voltages generated by the AC voltage source 22 are applied to the linearization pattern sections 30a via the wirings 32. Note here that the linearization pattern sections 30 are electrically connected to the transparent conductive film 12 via the anisotropic conductor 34.

The AC voltages generated by the AC voltage source 22 are applied to the areas in the vicinity of the four corners of the transparent conductive film 12 via the electrically connected linearization pattern sections 30a. The voltage of the transparent conductive film 12 is expressed as Vc in the position detecting period of FIG. 6.

As described, the AC voltages are supplied uniformly from the vicinity of the four corners of the transparent conductive film 12. When the surface of the LCD is touched by the finger 24 as an example of the contact mean, a capacitance 25 is formed between the finger 24 and the transparent conductive film 12 in the area that corresponds to the touched part. At this time, a potential of the user is grounded via the finger 24, so that there is a potential difference generated between the finger 24 and the AC voltage source 22. Thus, an electric current flows via the capacitance 25 from the touched position to the vicinity of the four corners through the transparent conductive film 12.

In the meantime, while each of the linearization pattern sections 30b is isolated on the display device substrate 10, each of those is in contact with the anisotropic conductor 34 and electrically connected to the transparent conductive film 12 via the anisotropic conductor 34.

The linearization pattern sections 30b decrease the resistance in the corresponding area of the transparent conductive film 12. Therefore, the outer-peripheral area of the transparent conductive film 12 can be kept to the same potential, even if the potential of the transparent conductive film 12 in the area corresponding to the touched position becomes lowered because of the capacitance coupling caused when the finger 24 touches the surface of the LCD.

There are voltage drops generated in the outer-peripheral area with respect to the AC voltage sources 22 in the vicinity of the four corners of the transparent conductive film 12. However, the resistance from the vicinity of the four corners of the transparent conductive film 12 to an arbitrary point of the outer-peripheral area is adjusted by the linearization pattern sections 30b and the like to make the voltage drops at the arbitrary point of the outer-peripheral area uniform.

The resistance from the areas of the vicinity of the four corners to an arbitrary point on a neighboring side is adjusted by combining a low resistance area where the linearization pattern section 30b is provided and a high resistance area where the linearization pattern section 30b is not provided.

At this time, signals corresponding to the electric currents Ia, Ib, Ic, Id detected by the four current detecting circuits 13 are calculated to detect the presence of a touch by the finger and the position coordinates (x,y) thereof.

Examples of the calculations may be expressed as following Expression 1 and Expression 2.

$$x = (Ic+Id)/(Ia+Ib+Ic+Id)k_1 + k_2 \quad \text{Expression 1}$$

$$y = (Ib+Ic)/(Ia+Ib+Ic+Id)k_1 + k_2 \quad \text{Expression 2}$$

Note here that "x" is the X coordinate of the touched position, and "y" is the Y coordinate of the touched position. Further, "$k_1$" and "$k_2$" are invariables, and Ia, Ib, Ic, Id are the electric currents detected by the four current detecting circuits 13.

As described above, the transparent conductive film 12 functions as a transparent conductive film of a static capacitive touch sensor during the position detecting period.

(Manufacturing Method)

Next, various kinds of processing procedures as the manufacturing method of the display device having the above-described structures (display device manufacturing method) will be described by referring to FIG. 5. FIG. 5 is a sectional view which schematically shows an example of the display device for describing the display device manufacturing method according to the first exemplary embodiment of the invention. While a black matrix 58 and an overcoat layer 54 are illustrated in FIG. 5, those are omitted in the other drawings.

The display device manufacturing method according to the exemplary embodiment is directed to a structure which can perform displays by having a display element capable of performing electro-optical response formed between conductible first and second substrates, and can detect a contact position touched by a contact body by having a conductive impedance surface formed on the second substrate side.

As the basic structure, the display device manufacturing method can include: a first step which forms, on the first substrate, a linearization pattern section including a plurality of electrodes capable of performing linearization of an electric field on the conductive impedance surface and capable of detecting an electric current on the conductive impedance; a second step which forms, on the second substrate, a counter substrate functioning as the conductive impedance surface; and a third step which forms a conductive member between the linearization pattern sections and the counter electrode.

Note here that the conductive impedance surface is a surface where an electric field curve distribution (potential distribution) is formed on the transparent conductive film, when voltages are applied to the transparent conductive film from the vicinity of the four corners.

Further, linearization of the electric field is to form equipotential lines in parallel to each side of the outer periphery in such a manner that the intervals between the equipotential lines become uniform (to keep the linearity and the orthogonal of the electric fields).

Therefore, it becomes possible to perform linearization of the electric fields of the conductive impedance surface by the use of the linearization pattern sections.

Further, the first step can be executed simultaneously with a step for forming the pixel electrode on the first substrate or a step for forming the wirings on the first substrate.

Furthermore, the first step can include a series of steps for forming a conductive film, performing PR, and performing etching.

More specifically, the manufacturing method (first step) of the display device substrate 10 (first substrate) will be described by referring to a case of a low-temperature polysilicon TFT. That is, the display device substrate 10 (first substrate) can be formed with a TFT substrate.

As the basic structure of TFT, employed is a coplanar type having a gate electrode formed higher than a channel polysilicon, and the conductive type is an n-channel type which uses electrons as carries of the channel electric current.

Referring to FIG. 5, the glass 23 (transparent substrate) of the display device substrate 10 is covered by a silicon oxide film 46a, and a polysilicon film 48 is formed thereon in an island form.

Here, a V-group element such as phosphor is doped in the areas of the polysilicon film to be a drain area 49a and a source area 49b.

Further, even though not shown, LDD (lightly doped drain) to which a smaller amount of phosphor than that of the source/drain areas is introduced may be provided between the channel area and the source/drain areas.

With the LDD-structure TFT, concentration of the electric fields on the boundary of the drain can be eased by making the gradient of the impurity concentrations from the channel to the drain gradual through providing a low-concentration impurity area in the boundary between the channel and the drain. Thus, a leak current suppressing effect can be achieved.

The island-form polysilicon film 48 is covered by a silicon oxide film 46b, and a gate electrode 52 is formed thereon. Note here that the silicon oxide film 46b in the area sandwiched between the polysilicon film 48 and the gate electrode 52 serves as a gate insulating film.

Further, a storage capacitance (not shown) may be formed by the silicon oxide film 46b. A silicon oxide film 46c covers the gate electrode 52. The gate electrode 52, the drain area 49b, and the source area 49b are opened by forming contact holes in the silicon oxide film 46c.

The AL (aluminum) 42 is sputtered on the silicon oxide film 46c, and a resist mask is remained in the areas to be the signal line (electrode), the pixel electrode 5, and the linearization pattern sections 30 (not shown). Thereafter, the AL (aluminum) 42 is dry-etched to perform patterning.

An interlayer insulating film 41 is formed on the AL (aluminum) 42. This interlayer insulating film 41 is configured with stacked layers of a silicon nitride film and an acryl film. Through forming contact holes in the interlayer insulating film 41, the signal line (electrode), the pixel electrode 5, and the linearization pattern sections 30 are opened. At last, after sputtering the ITO (transparent conductive film) 40, the ITO (transparent conductive film) 40 is etched except the ITO (transparent conductive film) 40 configuring the source electrode and the ITO (transparent conductive film) 40 configuring the linearization pattern sections 30 to complete the display device substrate. The linearization pattern sections 30 are configured with stacked layers of "ITO 40/AL 42".

As described, the linearization pattern sections 30 (30a, 30b) are formed by a conductive film that is the same layer of a single layer of conductive film or a plurality of layers of conductive films which configure the pixels or the peripheral circuits on the first substrate (display device substrate).

The case of the n-type channel has been described above. In a case of p-channel type, "p" and "n" may simply be switched. Further, both the n-channel type and the p-channel type may be used as well.

The scanning line driving circuit 14 and the signal line driving circuit 15 can be formed by using the n-type TFT and the p-type TFT.

Further, while the display device substrate 10 is formed by a low-temperature polysilicon TFT process in the first exemplary embodiment, the display device substrate 10 may also be formed by an amorphous silicon TFT process.

Furthermore, the display device substrate 10 may also be formed by other TFT process such as a micro crystal silicon TFT process, an oxide TFT process, an organic TFT process, or a process which forms TFT after transferring a silicon thin film on a supporting substrate.

Further, after forming a circuit by using the polysilicon TFT process, the amorphous silicon TFT process, a bulk silicon process, an SOI process, or the like, it may be transferred to another substrate to form the display device substrate 10.

Next, a method (second step) for forming the counter substrate 19 will be described.

As a pixel part, color filters are provided in matrix (not shown) on the glass 23 (transparent substrate) of the counter substrate 19. The effective aperture part of the pixel part is limited because of the wirings and the gaps therebetween, the black matrix 58, and the like. The color filters and the black matrix 58 are covered by the overcoat layer 54 formed with acryl or the like, and the transparent conductive film 12 is formed on the overcoat layer 54. Further, an alignment film formed with polyimide or the like (not shown) is printed on the transparent conductive film 12.

Next, a third step will be described. In this step, a TFT-LCD panel is formed by combining the above-described display device substrate 10 and the counter substrate 19. Further, the liquid crystal is filled between the display device substrate 10 and the counter substrate 19 on the pixel TFT side that is the right side of FIG. 5.

In the meantime, on the linearization pattern section 30 side that is the right side of FIG. 5, the anisotropic conductor 34 is in contact with the ITO (transparent conductive film) 40 of the display device substrate 10 and the transparent conductive film 12 on the counter substrate.

While there has been described by referring to a case of a transmissive-type LCD which displays images by modulating surface backlight from a back side with the LCD, the embodiment can be applied also to a reflective-type LCD which utilizes peripheral light for display by forming a metal electrode to be a reflection plate on the above-described display device substrate 10. Further, the embodiment can also be applied to a transflective-type LCD used for both transmission and reflection types by forming minute dot-like holes in a net form on the reflection plate.

While the first exemplary embodiment uses glass as the base material for the glass substrate 23 and the display device substrate 10, it is also possible to use a flexible material. In that case, the transparent conductive film 12 used for detecting positions is formed in the counter substrate 19 in a unified manner. Thus, mechanical distortion is not easily generated by a bending stress, and the position detecting performance is not deteriorated by the bend.

(Effects)

As described above, it is possible with the first exemplary embodiment to provide a display device with a built-in touch sensor, which is suited for reducing the weight, the size, and the thickness, and also is capable of accurately detecting the position touched by the finger.

Further, the first exemplary embodiment does not require an additional step for forming the linearization pattern sections 30 on the counter substrate 19, and also does not require the special manufacturing device and resources for the additional step. As a result, the manufacturing cost of the display device can be decreased.

That is, it is unnecessary to add a new step, when the linearization pattern sections 30 are formed simultaneously in any of the steps for forming the electrodes or the wirings on the display device substrate. Further, when the step for forming the electrodes or the wirings and the linearization patterns is configured with a series of steps (referred to as PR step hereinafter) for forming a conductive film, performing PR (photolithography), and performing etching, those can be achieved with the same step for forming the display pixels and the like. Therefore, it is unnecessary to specifically add the steps for forming linearization pattern sections. The linearization pattern sections may simply be added to the layout of the photo mask and the like.

Further, with the first exemplary embodiment, the pattern can be formed in a highly accurate manner by the PR step than the case of other methods such as screen printing. That is, the linearization pattern sections can be made in a highly precise pattern for precise positioning through forming the linearization pattern sections on the display device substrate through the PR step. As a result, it becomes easy to employ still thinner lines, so that detecting accuracy of the positions touched by the finger or the pen can be improved. At the same time, it is possible to reduce the area occupied by the linearization pattern sections 30, thereby making it possible to provide a narrow-frame LCD.

Furthermore, it is possible with the first exemplary embodiment to reduce the resistance of the linearization pattern sections 30 still more by using a material that has low sheet resistance for the linearization pattern sections 30. Particularly, it is preferable to use AL (aluminum) or AL (aluminum) alloy instead of silver.

Further, through forming the linearization pattern sections 30 with the same layer as that of the pixel electrode 5, the contact resistance between the linearization pattern sections 30 and the anisotropic conductor 34 can be reduced. This is because the ITO (transparent conductive film) 40 is in contact between the anisotropic conductor 34 and the same layer as that of the signal line (electrode) 4 of the pixel electrode 5, and the ITO (transparent conductive film) 40 exhibits a fine contact property for both the material of the signal line (electrode) 4 and the anisotropic conductor 34, thereby having low resistance.

Practically, the linearization pattern sections 30 were formed with the same layer as that of the pixel electrode 5, and each area of the pattern of the ITO (transparent conductive film) 40 for forming the linearization pattern section 30 was designed as 1 mm$^2$. The resistance between the ITO (transparent conductive film) 40 and the transparent conductive film 12 via the anisotropic conductor 34 in that case was as small as 1Ω.

As described above, the contact resistance between the linearization pattern sections 30 on the display device substrate 10 and the anisotropic conductor 34 is reduced, which can provide an effect of greatly reducing the resistance in the specific areas of the transparent conductive film 12.

Further, the anisotropic conductor (conductive member), is possible to reduce the resistance in a partial area of the opposing conductive impedance surface by having it corresponded to the pattern of the linearization pattern sections through electrically connecting the linearization pattern sections on the display device substrate and the conductive impedance surface. It can be considered as if the linearization pattern sections formed on the display device substrate are projected upon the conductive impedance surface on the counter substrate.

Now, the corresponding relation between the structural elements of the exemplary embodiment and the structures of the present invention will be described. The display device of the present invention is capable of: performing displays by having a display element (reference numeral 2 shown in FIG. 1, for example) capable of performing electro-optical response formed between the conductible first and second substrates; and detecting contact positions touched by a contact body through detecting, at a plurality of points, electric current values flowing on the conductive impedance surface formed on the second substrate (reference numeral 10 or the like shown in FIG. 1, for example). This display device includes the linearization pattern sections 30 (structures configured with reference numerals 30a, 30b shown in FIG. 1, for example) formed on the first substrate (reference numeral 10 shown in FIG. 1, for example) side, and a conductive member (reference numeral 34 shown in FIG. 1, for example) which electrically connects the linearization pattern sections and the conductive impedance surface.

Further, the display device can display images by forming the display element capable of performing electro-optical responses between the first and second substrates by using a sealing device. The second substrate can detect the touched positions by having the conductive impedance surface formed thereon and measuring, at a plurality of points, the electric current values flown at the contact point touched by the contact body. The first substrate opposes against the conductive impedance surface, and the linearization pattern, the control part of the display element, and the wirings can be formed thereon.

As an exemplary advantage according to the invention, it becomes unnecessary to form the linearization pattern sections on the second substrate through forming the linearization pattern sections on the first substrate side. Thus, no special manufacturing device and resources are required. Therefore, it is possible to provide a display device and the like with a small occupied area of the linearization pattern sections in reduced weight, size, and thickness, which can detect the positions touched by the contact body accurately while reducing the cost for manufacturing the display devices.

Second Exemplary Embodiment

Figure 7:
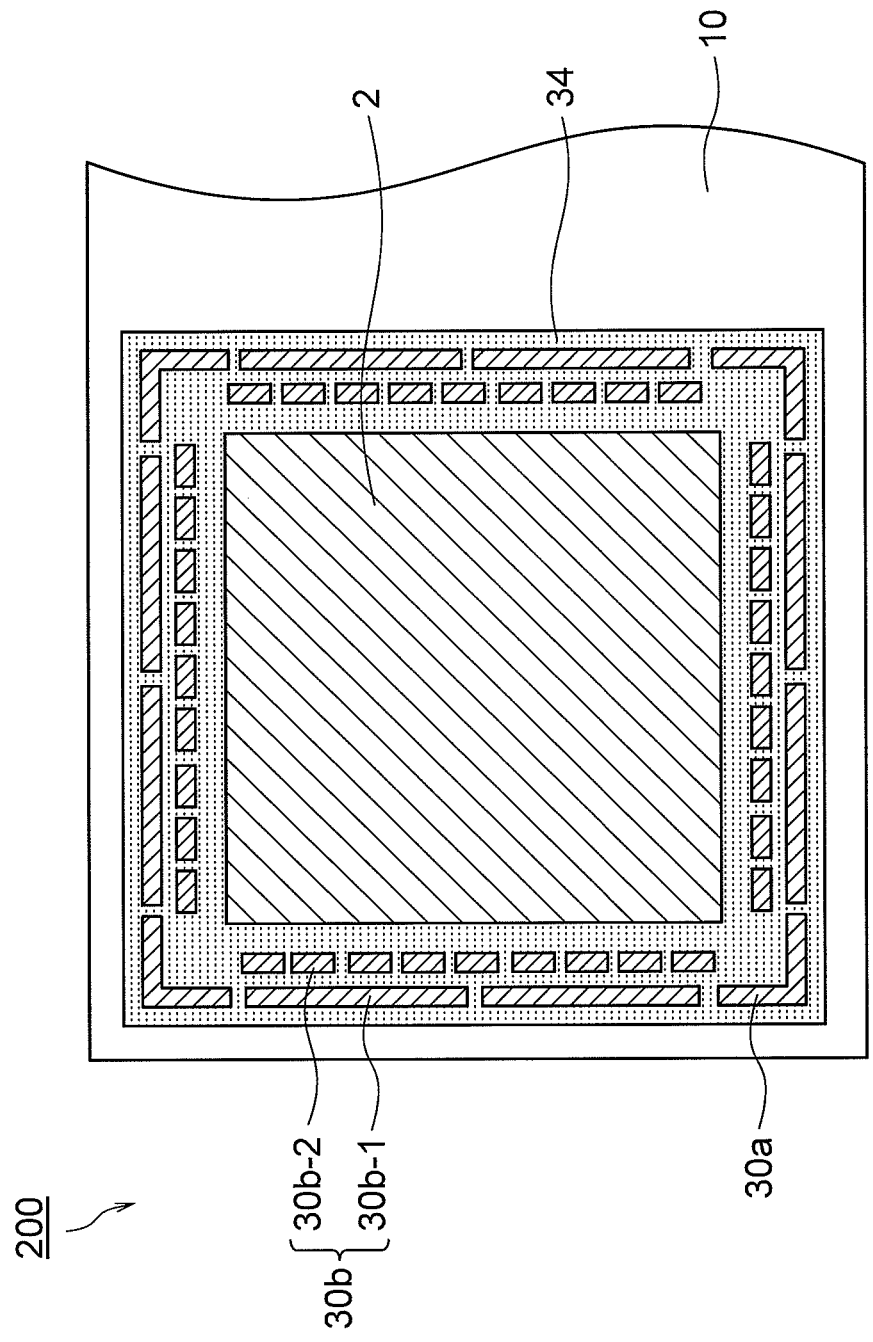
FIG. 7 is a plan model illustration showing an example of a schematic structure which illustrates a relation between linearization pattern sections and an anisotropic conductor of a display device according to a second exemplary embodiment of the invention.

Next, a second exemplary embodiment of the invention will be described by referring to FIG. 7. Hereinafter, the practically same structural elements as those of the first exemplary embodiment are omitted, and only different points will be described. FIG. 7 is a plan model illustration showing an example of a schematic structure of a display device according the second exemplary embodiment of the invention.

In the above-described first exemplary embodiment, the anisotropic conductor and the sealing agent are different structural elements. However, the second exemplary embodiment employs a structure where the anisotropic conductor also functions as the sealing agent. That is, it is a case where the conductive member is inserted between the first substrate and the second substrate to function as the sealing agent for sealing the display element.

Specifically, as shown in FIG. 7, in a display device 200 according to the second exemplary embodiment, linearization pattern sections 30 on a display device substrate 10 and a transparent conductive film 12 are electrically connected via an anisotropic conductor 34, as in the case of the first exemplary embodiment (FIG. 2). A difference with respect to FIG. 2 is that the display device substrate 10 and a counter substrate 19 are adhesively laminated via the pattern of the same anisotropic conductor 34 in order to connect those electrically and to seal a liquid crystal 2 at the same time.

As the anisotropic conductor 34, it is preferable to use a sealing agent in which conductive particles are mixed. An epoxy resin is used as the sealing agent, and gold balls or the like are used as the conductive particles. Further, as a method for laminating the substrates via the seal, the sealing agent is applied to a sealing part of one of the substrates to adhesively stick the substrates with each other when the substrates are laminated. Thereafter, the substrates are sintered to perform thermosetting of the sealing agent.

Described now is the effect of the anisotropic conductor 34 which electrically connects the linearization patterns 30 and the transparent conductive film 12 and seals the liquid crystal 2 at the same time.

The first exemplary embodiment (FIG. 2) has the anisotropic conductor 34 which electrically connects the linearization pattern sections 30 on the display device substrate 10 and the transparent conductive film 12, and has the sealing agent 36 for sealing the liquid crystal 2 as separate patterns. With this structure, the pattern of the anisotropic conductor 34 and that pattern of the sealing agent 36 occupy large areas. This results in raising a new issue, such as expanding the frame area of the LCD.

In the meantime, with the structure of FIG. 7, the pattern (reference numeral 36 of FIG. 2) of the sealing agent 36 can be omitted by electrically connecting the linearization pattern sections 30 on the display device substrate 10 and the transparent conductive film (not shown) and by sealing the liquid crystal 2 at the same time with the pattern of the anisotropic conductor 34 which also has a function of the sealing agent. Thus, the area that may otherwise be occupied by the sealing agent 36 can be decreased. As a result, the frame of the LCD can be narrowed.

Other structures, steps, functions, and operational effects thereof are the same as those of the above-described exemplary embodiment. Further, it is also possible to put the processing contents of the manufacturing device used for the method for manufacturing through each of the steps described above, the structural elements of each part (circuit), and each function thereof into programs to have those programs executed by a computer.

Third Exemplary Embodiment

Figure 8:
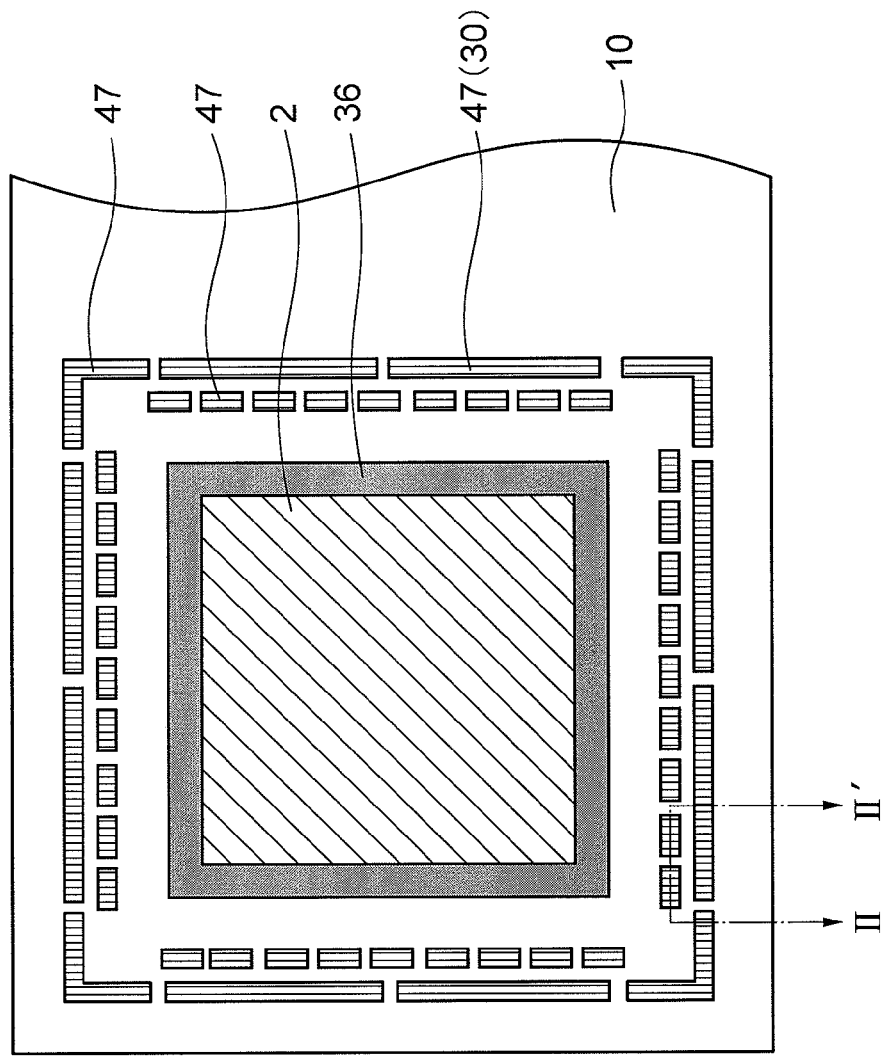
FIG. 8 is a plan model illustration showing an example of a schematic structure which illustrates a relation between linearization pattern sections and an anisotropic conductor of a display device according to a third exemplary embodiment of the invention.
Figure 9:
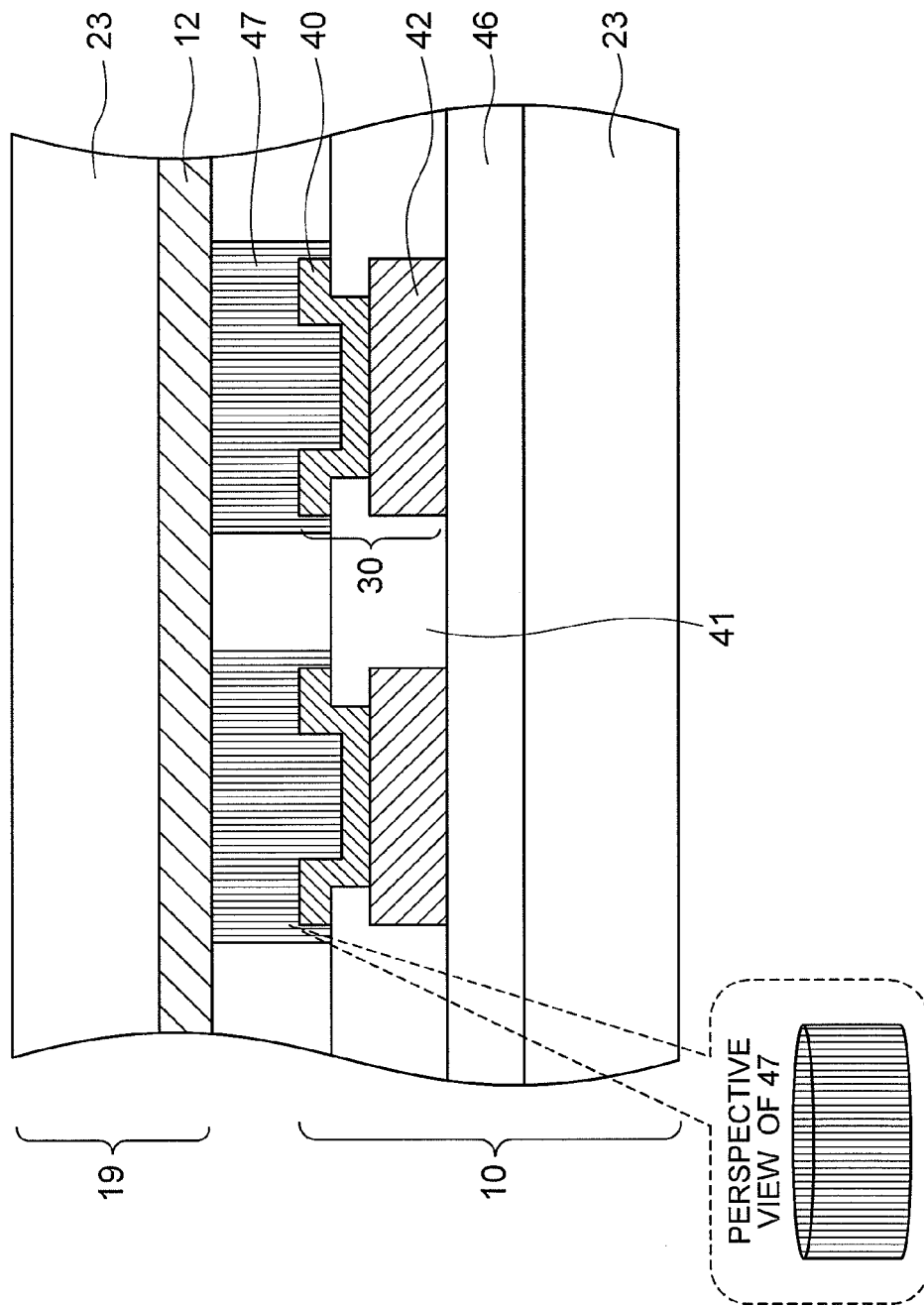
FIG. 9 is a fragmentary sectional view showing a II-II' part of FIG. 8.

Next, a third exemplary embodiment of the invention will be described by referring to FIG. 8 and FIG. 9. Hereinafter, the practically same structural elements as those of the first exemplary embodiment are omitted, and only different points will be described. FIG. 8 is a plan model illustration showing an example of a schematic structure which illustrates a relation between linearization pattern sections and an anisotropic conductor of a display device according to the third exemplary embodiment of the invention. FIG. 9 is a fragmentary sectional view showing a II-II' part of FIG. 8.

In this exemplary embodiment, the layout pattern of the conductor as an example of the conductive member is formed to correspond to the layout pattern of the linearization pattern sections. That is, it is a case where the conductive member is formed to have a pattern of a plurality of divided sections, and the conductive member pattern has the same layout pattern as that of the linearization pattern sections.

Specifically, as shown in FIG. 8, in a display device 300 of this exemplary embodiment, the layout of the pattern of a conductor 47 which electrically connects linearization pattern sections 30 on a display device substrate 10 and a transparent conductive film 12 is formed to correspond to the layout of the linearization pattern sections 30. The conductor 47 may be of an isotropic type or an anisotropic type.

More specifically, since the layout of the pattern (conductor pattern) of the conductor 47 is formed to be same as that of the linearization patterns 30 on the display device substrate 10, the pattern of the conductor 47 comes to have a set of a plurality of divided conductors 47, and neighboring conductors 47 are not electrically connected. Here, the liquid crystal 2 is sealed by the sealing agent 36.

Further, the pattern of the conductors 47 is in the same layout as that of the linearization pattern sections 30, so that the reference numerals 47 overlap with the reference numerals (30a, 30b) in the plan model illustration shown in FIG. 8. The fragmentary sectional view of FIG. 9 shows a laminated structure of the part shown indicated by reference numeral 30 (30a, 30b) and the part indicated by reference numeral 47.

It is preferable to form the conductors 47 with post (cylindrical) spacer or the like, for example. Normally, spacer is spherical bodies with a uniform particle diameter or cylinders with a uniform diameter. In the display part, the spacer functions to keep the thickness (cell gap) between the display device substrate 10 and the counter substrate 19 on the black matrix of the counter substrate 19.

Normally, the post spacer is an insulator using glass or plastics as a material. However, a conductive material is used in this case to electrically connect the display device substrate 10 with the counter substrate 19.

Next, the effect of the pattern of the conductors 47 designed to correspond to the linearization pattern sections 30 will be described.

The linearization pattern sections 30 on the display device substrate 10 and the transparent conductive film 12 can be electrically connected via the conductors 47. However, the areas where the resistance of the transparent conductive film 12 is reduced depend on the pattern of the conductors 47.

Thus, when the pattern of the conductors 47 is formed in a single pattern which covers all the linearization pattern sections 30 on the display device substrate 10 as in the case of the first exemplary embodiment (FIG. 2), the conductors 47 are electrically connected to the surface that is in parallel to the film surface if the conductors 47 are electrically isotropic. Therefore, the areas of the transparent conductive film 12 where the resistance is reduced are to depend on the pattern of reference numeral 34 shown in FIG. 2.

Thus, the pattern of the conductors 47 is formed to correspond to the linearization pattern sections 30, so that the neighboring conductors 47 are not electrically connected to each other. In this case, the conductors 47 do not have to be electrically anisotropic but may be isotropic as well.

As described above, it is possible with this exemplary embodiment to achieve an effect of reducing the resistance in a desired area of the transparent conductive film 12 even with the use of the electrically isotropic conductors 47 that are electrically isotropic, while achieving the same operational effects as those of the first exemplary embodiment. Since it is not necessary for the conductors to be electrically anisotropic, ranges of selections regarding the conductor materials can be expanded. Therefore, it is possible to select a low-price material.

Further, by using the conductors 47 as the post spacer, it becomes possible to form the conductors 47 by the same step that is performed for forming the post in order to keep the gap between the display device substrate 10 and the counter substrate 19 within the substrate plane uniform. As a result, it becomes unnecessary to add a new step, thereby making it possible to reduce the cost for manufacturing the display devices.

Other structures, steps, functions, and operational effects thereof are the same as those of the above-described exemplary embodiment. Further, it is also possible to put the processing contents of the manufacturing device used for the method for manufacturing through each of the steps described above, the structural elements of each part (circuit), and each functions thereof into programs to have those programs executed by a computer.

Fourth Exemplary Embodiment

Figure 10:
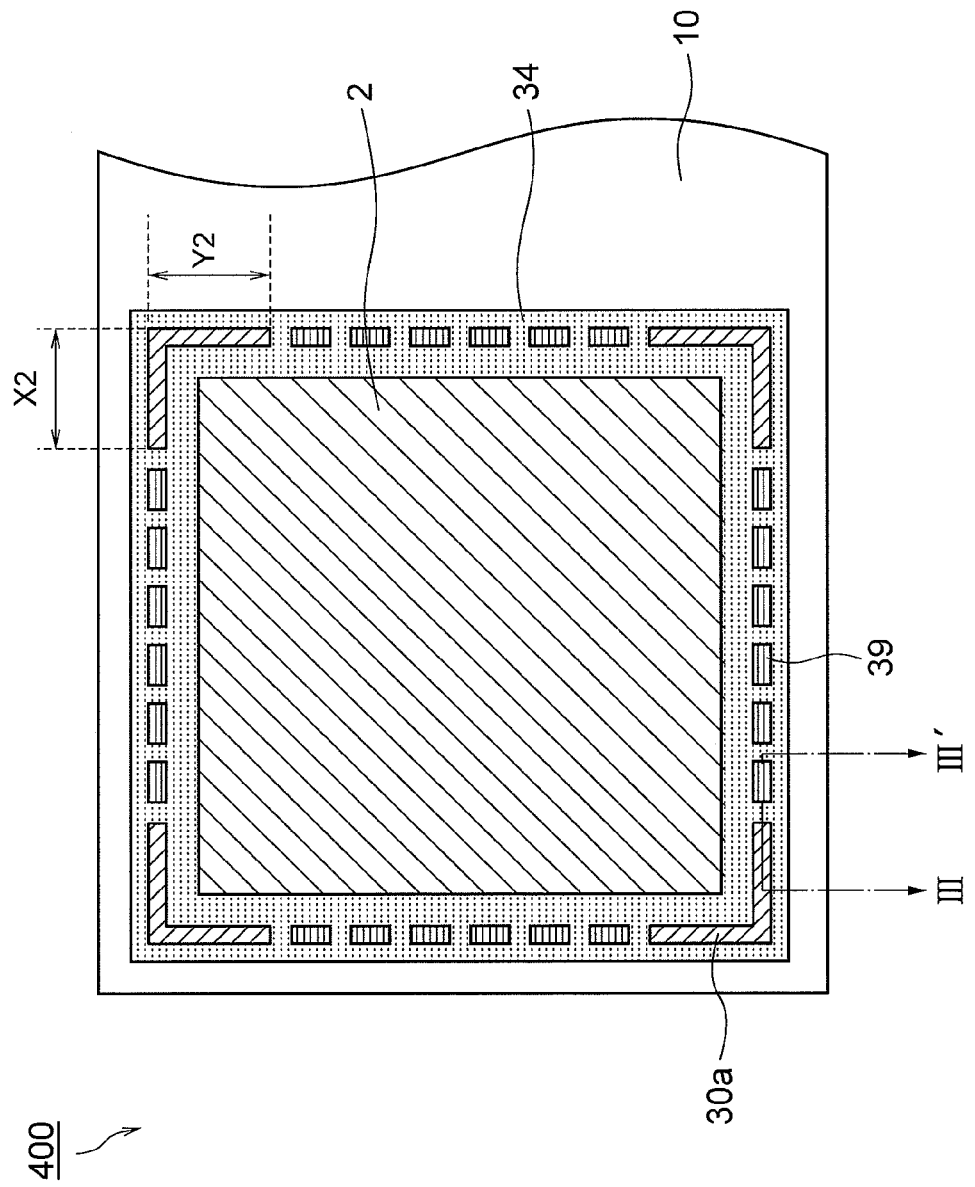
FIG. 10 is a plan model illustration showing an example of a schematic structure which illustrates a relation between linearization pattern sections and an anisotropic conductor of a display device according to a fourth exemplary embodiment of the invention.
Figure 11:
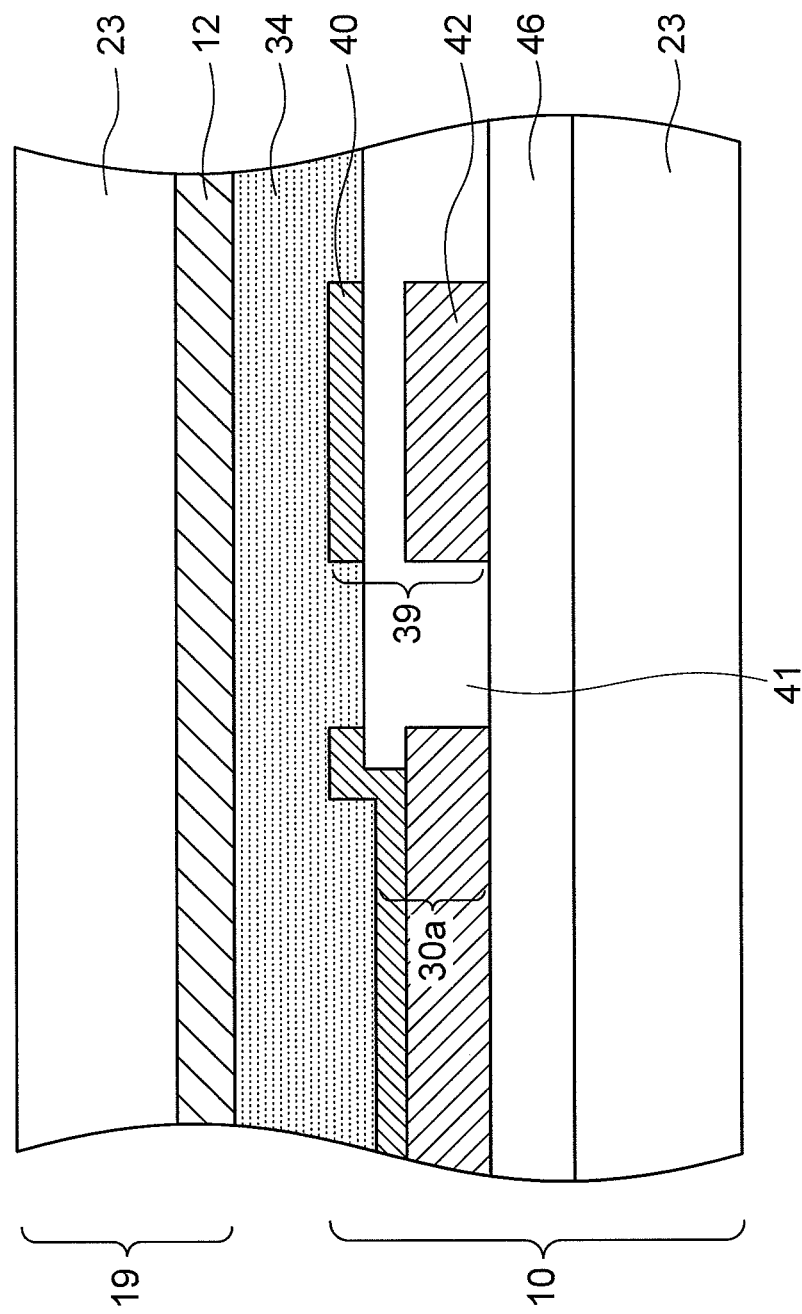
FIG. 11 is a fragmentary sectional view showing an III-III' part of FIG. 10.

Next, a fourth exemplary embodiment of the invention will be described by referring to FIG. 10 and FIG. 11. Hereinafter, the practically same structural elements as those of the first exemplary embodiment are omitted, and only different points will be described. FIG. 10 is a plan model illustration showing an example of a schematic structure which illustrates a relation between linearization pattern sections and an anisotropic conductor of a display device according to the fourth exemplary embodiment of the invention. FIG. 11 is a fragmentary sectional view showing a III-III' part of FIG. 10.

This exemplary embodiment employs a structure in which the linearization pattern sections provided separately in the vicinity of the four corners of the display device substrate are formed long. That is, this is a case where the linearization pattern sections are formed in the corners of the first substrate, and the linearization pattern sections include the first pattern sections (30a) which are connected to the wiring part to which position detecting voltages are supplied, and the second pattern sections (30b) which are formed on the side areas of the first substrates, and not connected to the wiring part. The first pattern sections are extended from the corners towards the side areas.

Specifically, as shown in FIG. 10, in a display device 400 according to the fourth exemplary embodiment, linearization pattern sections 30 on a display device substrate 10 and a transparent conductive film 12 are electrically connected via an anisotropic conductor 34, and a liquid crystal 2 is sealed with the same anisotropic conductor pattern 34, as in the case of the second exemplary embodiment (FIG. 7). However, it is different from the second exemplary embodiment (FIG. 7) in terms of the layout of the linearization pattern sections 30.

More specifically, the linearization pattern sections 30a provided separately in the vicinity of the four corners of the display device substrate 10 are formed to extend towards the centers of the neighboring sides thereof. That is, the linearization pattern section 30a (first pattern section) is formed to extend from the corner to the side part in an extending range from the corner to the vicinity of the center of the side.

A wiring 32 is connected to the linearization pattern sections 30a. This wiring 32 is connected to an AC voltage source 22 (not shown).

Further, as shown in 10, dummy patterns 39 insulated from an Al (aluminum) electrode 42 via an insulating layer 41 may be provided in the four sides of the outer peripheral area of the display device substrate 10, instead of providing the linearization pattern sections divided into a plurality of sections on the display device substrate 10.

The linearization pattern sections 30 are in contact with the anisotropic conductor 34 and electrically connected to the transparent conductive film 12 via the anisotropic conductor 34. However, the dummy patterns 39 are covered by the insulating layer 41 and not in contact with the anisotropic conductor 34, so that the dummy patterns 39 are not electrically connected to the transparent conductive film 12.

It is preferable for the dummy patterns 39 to be formed by using the same layer as that of the linearization pattern sections 30.

As shown in FIG. 10, the linearization pattern section 30a is extended from the vicinity of the four corners of the display device substrate 10 towards the centers of the neighboring sides, and there are areas in the vicinity of the center of the sides where no linearization pattern section 30a is provided.

Therefore, compared to the areas where the linearization pattern sections 30a are provided, there are recessed areas generated on the display device substrate 10 in the areas having no linearization pattern section 30a, because of the thickness of the linearization pattern section 30a. This results in having the locally large gap generated between the display device substrate 10 and the counter substrate 19.

Therefore, the dummy patterns 39 are provided in the areas having no linearization pattern sections 30a, which provides as effect of improving the uniformity of the gap of the LCD.

Specifically, the pixel electrode (reference numeral 5 in FIG. 5) or the like is used. As shown in FIG. 11, the dummy pattern 39 is configured with layers of the AL (aluminum) 42, the insulating layer 41 (interlayer insulating film), and an ITO (transparent conductive film) 40. That is, the dummy pattern 39 as an example of the second pattern section can have a plurality of layers of conductive films configuring the pixel and the peripheral circuit formed on the display device substrate 10, and the interlayer insulating film between the plurality of the conductive films. Silicon nitride, acryl, or the like is used for the insulating layer 41 covering the dummy pattern 39. Further, no contact hole is formed in the areas of the insulating layer 41 corresponding to the dummy patterns 39.

Furthermore, the second pattern sections can be omitted as well.

Next, described are the operations of the linearization pattern sections 30a which are provided in the vicinity of the four corners of the display device substrate 10 by being extended towards the centers of the neighboring sides.

During the position detecting period for detecting the position touched by the finger or the pen, the electric currents flown in the transparent conductive film 12 are detected by a current detecting circuit (reference numeral 13 in FIG. 1) on an external substrate (reference numeral 20 in FIG. 1) via the anisotropic conductor 34 and the linearization pattern sections 30a.

In the meantime, during the display drive period, a common voltage is applied to the linearization pattern sections 30a via the anisotropic conductor 34 to keep the transparent conductive film 12 to the common potential. Then, the voltage of the signal line (electrode: reference numeral 4 in FIG. 4) is applied from the display device substrate 10 side and the common voltage is applied from the counter substrate to the liquid crystal 2 to change the light transmittance of the liquid crystal 2.

To extend the linearization pattern sections 30a towards the centers of the respective neighboring sides can provide an effect of reducing the resistance on the four sides of the outer periphery of the transparent conductive film 12.

The areas of the lowered resistance depend on the extended range of the linearization pattern sections 30a from the vicinity of the four corners towards the centers of the neighboring sides. The linearization pattern section 30a can be extended to the vicinity of the center of the sides as long as it does not reach other linearization pattern section 30a.

As described above, it is possible with this exemplary embodiment to achieve an effect that is the same effect obtained by providing the plurality of divided linearization pattern sections 30a on the four sides of the outer periphery of the display device substrate 10, while achieving the same operational effects as those of the exemplary embodiments described above.

Further, while the linearization pattern sections (reference numeral 30b in FIG. 7) are formed in a double structure, the linearization pattern sections 30a in the structure of the fourth exemplary embodiment are formed in a single structure. Therefore, the occupying area can be reduced.

As a result, it is possible to achieve an effect of narrowing the frame of the LCD.

Other structures, steps, functions, and operational effects thereof are the same as those of the above-described exemplary embodiment. Further, it is also possible to put the processing contents of the manufacturing device used for the method for manufacturing through each of the steps described above, the structural elements of each part (circuit), and each functions thereof into programs to have those programs executed by a computer.

Fifth Exemplary Embodiment

Figure 12:
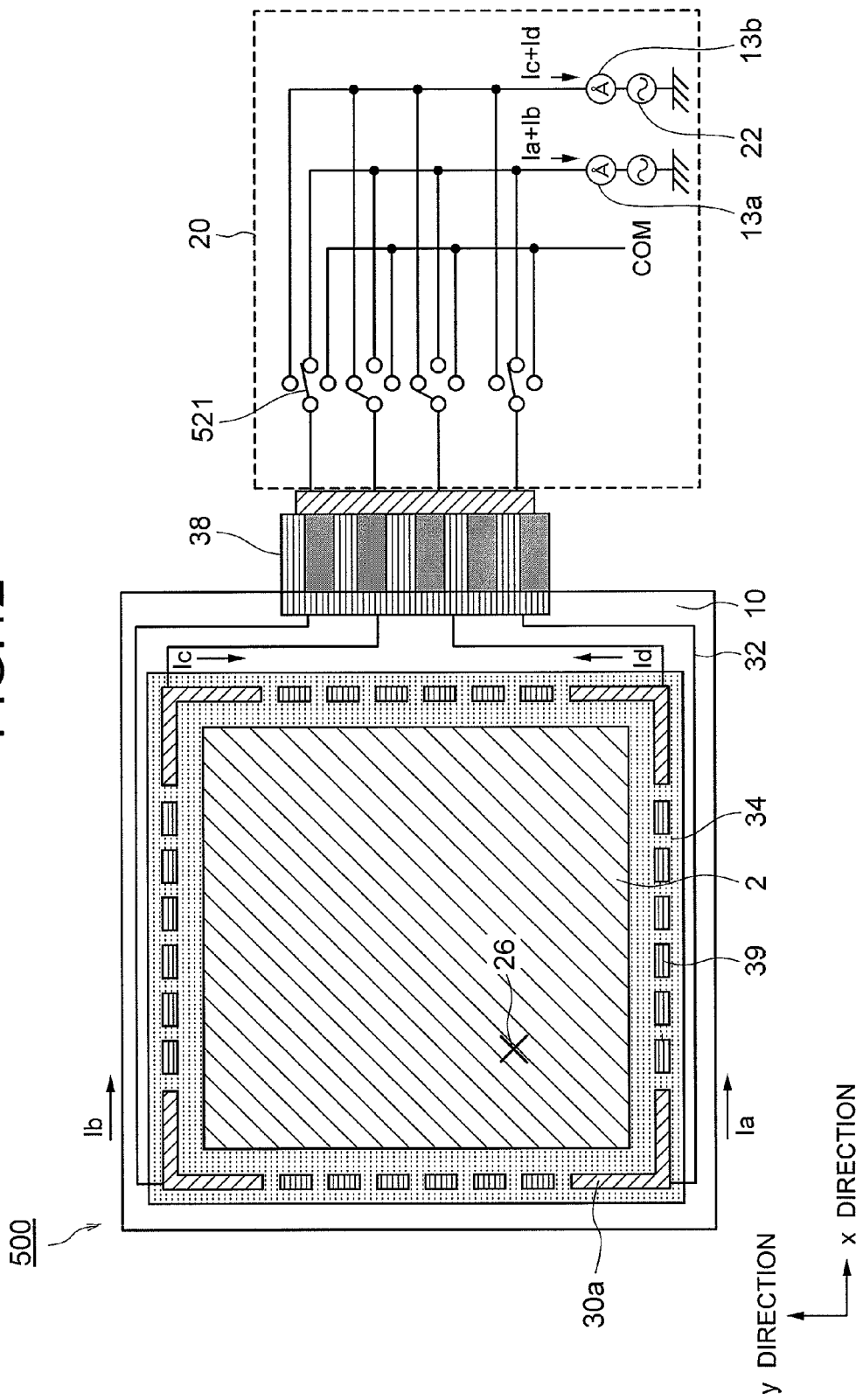
FIG. 12 is a plan model illustration showing an example of a schematic structure of a display device according to a fifth exemplary embodiment of the invention.
Figure 13:
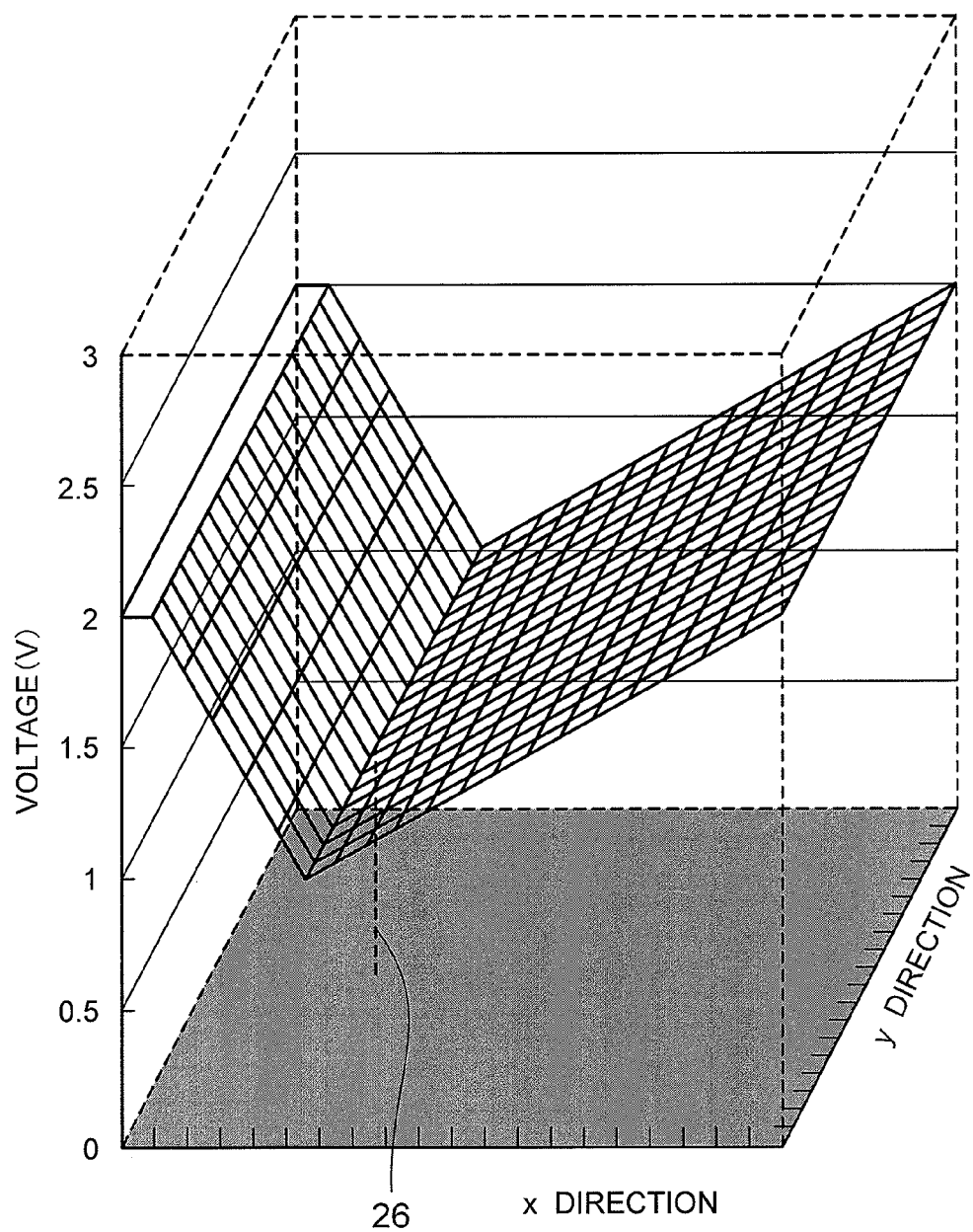
FIG. 13 is a perspective view showing a potential distribution of a counter electrode of the display device shown in FIG. 12.

Next, a fifth exemplary embodiment of the invention will be described by referring to FIG. 12 and FIG. 13. Hereinafter, the practically same structural elements as those of the first exemplary embodiment are omitted, and only different points will be described. FIG. 12 is a plan model illustration showing an example of a schematic structure of a display device according to the fifth exemplary embodiment of the invention. FIG. 13 is a perspective view showing the potential distribution of a transparent conductive film.

This exemplary embodiment employs a structure where the touched position detecting period is divided for a position x (direction) and a position y (direction).

Specifically, as shown in FIG. 12, in a display device 500 according to the fifth exemplary embodiment, linearization pattern sections 30 on a display device substrate 10 and a transparent conductive film (counter electrode) are electrically connected via an anisotropic conductor 34, as in the case of the fourth exemplary embodiment (FIG. 10). However, it is different from the fourth exemplary embodiment in respect that the fifth exemplary embodiment performs a control for dividing the detecting period for the position x (direction) and the position y (direction) during the detecting period of a finger touched position 26.

The circuit part shown in FIG. 12 illustrates a switching state during the position detecting period for the x direction of the finger.

More specifically, during the detecting period of the finger touched position 26, the display device 500 connects the linearization pattern sections 30a provided between the vicinity of the four corners of the display device substrate to current detecting circuits 13 via a current detecting direction change over switch 521.

In the period for detecting the position x (x direction that is a first direction), the display device 500 connects the linearization pattern sections 30a (lower-left section: first electrode, upper-left section: second electrode) to the current detecting circuit 13a (first current detecting circuit), and connects the linearization pattern sections 30a (upper-right section: fourth electrode, lower-right section: third electrode) to the current detecting circuit 13b (second current detecting circuit).

In the meantime, in the period for detecting the position y (y direction that is a second direction), the display device 500 connects the linearization pattern sections 30a (lower-left section, lower-right section) to the current detecting circuit 13a, and connects the linearization pattern sections 30a (upper-left section, upper-right section) to the current detecting circuit 13b.

The connection is switched by controlling the current detecting direction changeover switch 521 by a current detection switching control circuit (not shown). In this case, a "detecting period switching control device" can be configured with the current detecting direction changeover switch 521, the current detection switching control circuit (not shown), the current detecting circuit 13a (first current detecting circuit), and the current detecting circuit 13b (second current detecting circuit).

This "detecting period switching control device" is capable of executing a switching control of the detecting periods for detecting the contact position by dividing it to a first position detecting period for detecting the position in the first direction on the conductive impedance surface and to a second position detecting period for detecting the position in the second direction which crosses with the first direction.

Further, FIG. 12 shows the case where the linearization pattern sections 30a are extended from the vicinity of the four corners towards the centers of the respective neighboring sides on the four sides of the outer periphery of the display device substrate 10, as in the case of the fourth exemplary embodiment. However, it is also possible to provide the plurality of divided linearization pattern sections 30b on the four sides of the outer periphery of the display device substrate 10, as in the case of the first exemplary embodiment.

Further, while FIG. 12 shows the case of providing the anisotropic conductor 34 which electrically connects the linearization pattern sections 30 on the display device substrate 10 to the transparent conductive film (counter electrode) and seals the liquid crystal 2 at the same time, it is also possible to form the anisotropic conductors 34 separately for each function.

Next, the effects of the fifth exemplary embodiment (FIG. 12) will be described by referring to a case where the position x (touched by a finger) in the x direction is detected.

When a finger touches the surface of the LCD, the potential of the transparent conductive film (counter electrode) corresponding to the touched part 26 drops. Through connecting the linearization pattern sections 30 (lower left, upper left) provided in the vicinity of the four corners of the display device substrate 10 to the same current detecting circuit 13a, however, there is generated an effect of keeping the uniform potential in the side connecting the linearization pattern sections 30a (lower left, upper left).

It is possible to keep the uniform potential in the side connecting the linearization pattern sections 30a (upper right, lower right) in the same manner. As a result, there is a potential gradient generated in the x direction by having the area of the transparent conductive film (counter electrode) corresponding to the touched position 26 as the minimum. However, the potentials become uniform in the y direction, and equipotential lines in parallel to the y direction can be formed.

As described above, with this exemplary embodiment, the potential distribution becomes one-dimensional, so that the information regarding the position y can be eliminated in the period for detecting the x position. Therefore, it is possible to achieve an effect of improving the detection accuracy regarding the position x, while achieving the same operational effects as those of the first exemplary embodiment.

Further, the same is true for the case of detecting the position y touched by the finger.

Furthermore, the four current detecting circuits 13 required in the first exemplary embodiment (FIG. 1) can be reduced to two circuits. Therefore, the manufacturing cost of the current detecting circuits 13 can be reduced to half in the case of FIG. 12 where the current detecting circuits 13 are reduced to two circuits.

Furthermore, the display device of the fifth exemplary embodiment described above can also be formed as follows. That is, the first pattern sections (30a) of the linearization pattern sections include the first to fourth electrodes (lower left, upper left, upper right, lower right) arranged in the four corners of the first substrate. In this case, the detecting period switching control device can include: the first current detecting circuit (13a) which makes the potentials in the second direction on one end side of the first direction uniform and detects the electric currents in each of the first and second electrodes in the first position detecting period, and makes the potentials in the first direction on one end side of the second direction uniform and detects the electric currents in each of the first and third electrodes in the second position detecting period; the second current detecting circuit (13b) which makes the potentials in the second direction on the other end side of the first direction uniform and detects the electric currents in each of the third and fourth electrodes in the first position detecting period, and makes the potentials in the first direction on the other end side of the second direction uniform and detects the electric currents in each of the second and fourth electrodes in the second position detecting period; and the current detection switching control circuit (not shown) which performs a switching control regarding the connecting relations between each of the first to fourth electrodes and each of the first and second current detecting circuits.

Other structures, steps, functions, and operational effects thereof are the same as those of the above-described exemplary embodiment. Further, it is also possible to put the processing contents of the manufacturing device used for the method for manufacturing through each of the steps described above, the structural elements of each part (circuit), and each functions thereof into programs to have those programs executed by a computer.

Sixth Exemplary Embodiment

Figure 14:
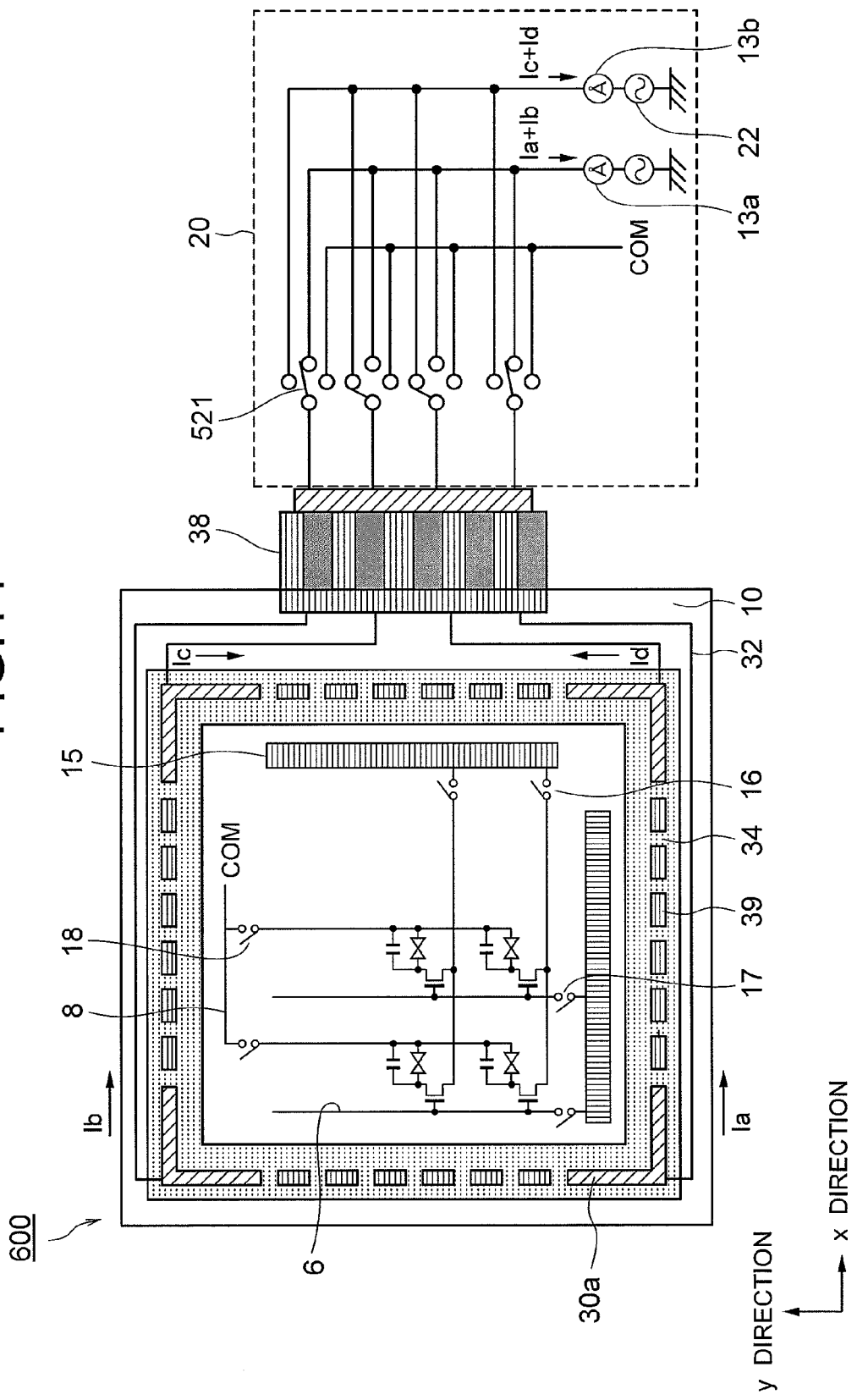
FIG. 14 is a plan model illustration showing an example of a schematic structure of a display device according to a sixth exemplary embodiment of the invention.

Next, a sixth exemplary embodiment of the invention will be described by referring to FIG. 14. Hereinafter, the practically same structural elements as those of the first exemplary embodiment are omitted, and only different points will be described. FIG. 14 is a plan model illustration showing an example of a schematic structure of a display device according to the sixth exemplary embodiment of the invention.

This exemplary embodiment employs a structure where switching elements are provided on the wirings for transmitting electric signals to the inside the display area form the outside the display area.

Specifically, as shown in FIG. 14, unlike the case of the fifth exemplary embodiment (FIG. 12), a display device 600 of this exemplary embodiment is provided with a high-impedance switch part 16 (first high-impedance switch), a high-impedance switch part 17 (second high-impedance switch), and a high-impedance switch part 18 (third high-impedance switch) formed on the wiring part for transmitting electric signals to a first circuit part within the display area from a second circuit part of the outside the display area.

Note here that the second circuit part of the outside the display area may be formed on the same substrate as that of the first circuit part within the display area or may be formed on an external substrate.

In a case where the second circuit part of the display area outside part may be formed on the same substrate as that of the first circuit part within the display area, it is preferable to provide the high-impedance switch parts 16, 17, and 18 on the wiring part which connects the display area outside part with the external substrate.

Specifically, the wiring part on which the high-impedance parts 16, 17, and 18 are provided are preferable to be at least one of the signal lines 4, the scanning lines 6, the capacitance lines 8, and the power supply lines (not shown).

Further, it is preferable to have a high-impedance switching control circuit for controlling the high-impedance switch parts, and preferable for the high-impedance switching control circuit to control at least one electrodes for transmitting the electric signal from the display area outside part to the display area inside part to be in a high-impedance state in a period where the current detecting circuit 13 detects the current.

Note here that an "impedance control device" can be configured with the high-impedance switch parts 16, 17, 18 and the high-impedance switching control circuit. This "impedance control device" may be formed on the display device substrate or may be formed on a separate control circuit substrate.

During the detecting period for detecting a contact position, this "impedance control device" can control the first circuit part within the display area of the first substrate to be in electrically higher impedance compared to that of the second circuit part that is outside the display area. Further, the "impedance control device" can control the first circuit part and the second circuit part to be in a non-conductive state. Furthermore, the "impedance control device" can include: a high-impedance switch part formed on the wiring part which connects the first circuit and the second circuit; and a high-impedance control circuit which performs on/off controls of the high-impedance switch part.

Next, operations of the high-impedance switch parts will be described.

For making it possible to control the circuit within a pixel matrix part and the circuit in the outer peripheral part of the display area to be electrically high impedance, in the outer-peripheral part of the display area, the high-impedance switch part 16 is provided to each signal path of the scanning lines 6, the high-impedance switch part 17 is provided to each signal path of the signal lines 4, and the high-impedance switch part 18 is provided to each signal path of the storage capacitance lines 8.

Switching of the high-impedance switch parts 16, 17, and 18 is controlled by the high-impedance switching control circuit, not shown. This makes it possible to control the scanning line 6 and the signal line 4 for transmitting the electric signals from the outside the display area to the inside thereof to be in a high-impedance state.

The vertical blanking period is utilized for the position detecting period. In the position detecting period, the high-impedance switch part 16, the high-impedance switch part 17, and the high-impedance switch part 18 are all set to off-state as in FIG. 14, and the signal line 4, the scanning line 6, and the storage capacitance line 8 are set to be in higher impedance with respect to the wirings (connected to the scanning line driving circuit 14, the signal line driving circuit 15, and the COM terminal) on the outer side of the display area.

Further, in the position detecting period, the current direction detecting switch 521 is in a conductive state with the AC voltage source 22 side including the current detecting circuits 13. In the state shown in FIG. 14, same-phase AC voltages generated by the AC voltage source 22 is applied to the linearization pattern sections 30a which are provided in the vicinity of the four corners of the display device substrate 10.

The linearization pattern sections 30a formed in the vicinity of the four corners of the display device substrate 10 are electrically connected to the transparent conductive film via the anisotropic conductor 34. Thus, the AC voltages are applied to the vicinity of the four corners of the transparent conductive film.

Further, FIG. 14 shows the case where the linearization pattern sections 30a are extended from the vicinity of the four corners towards the centers of the respective neighboring sides on the four sides of the outer periphery of the display device substrate 10. However, it is also possible to provide a plurality of divided linearization pattern sections 30b on the four sides of the outer periphery of the display device substrate 10.

Figure 15:
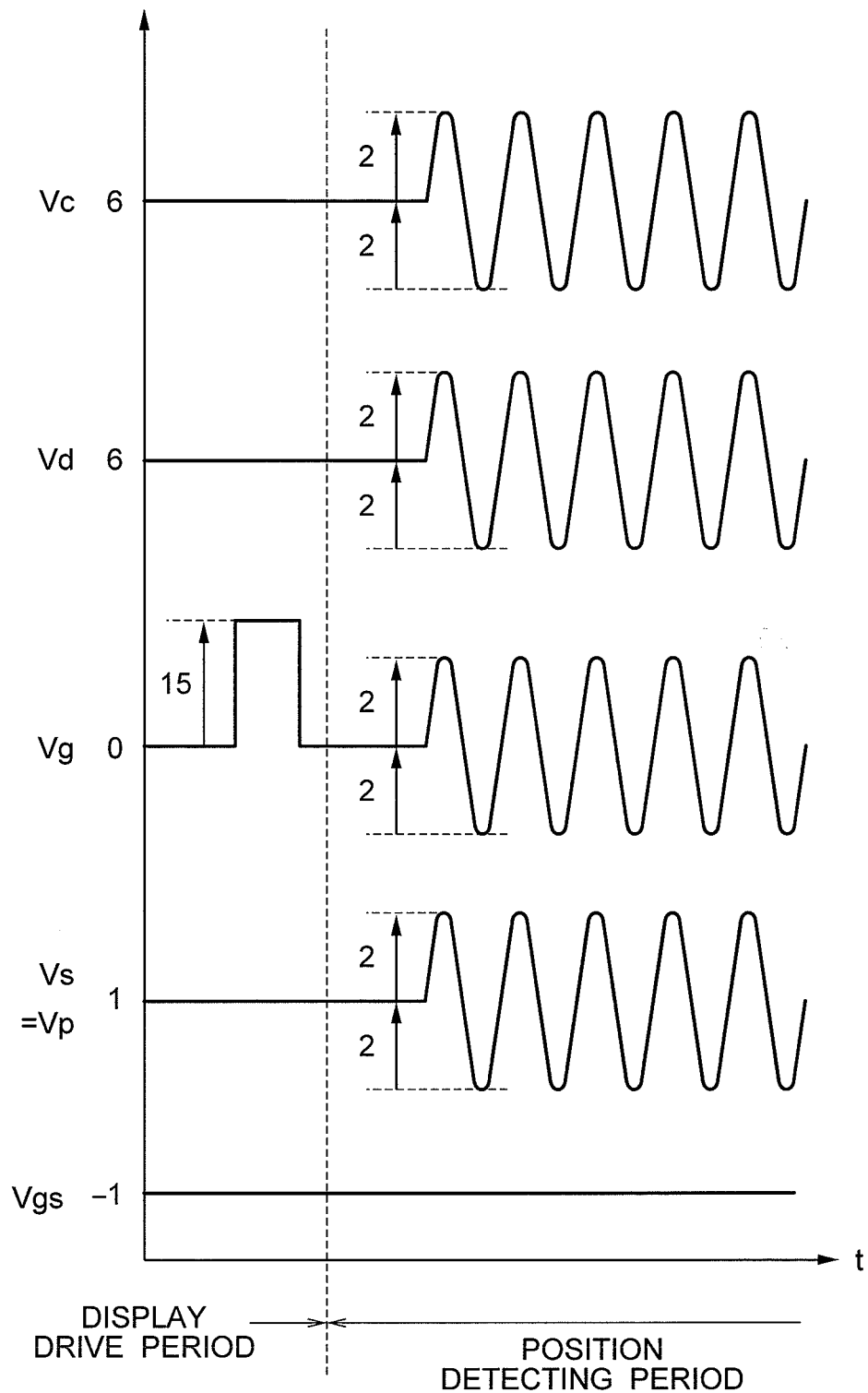
FIG. 15 is a timing chart which schematically shows a state of voltages of electrodes of the display device shown in FIG. 14.

FIG. 15 is a timing chart showing voltages of electrodes of the display device according to the sixth exemplary embodiment. The voltage of the transparent conductive film is shown as Vc in FIG. 15.

Referring to the timing chart of the voltages shown in FIG. 15, each scanning line 6 is in a high-impedance state and capacitance thereof is coupled with the transparent conductive film. Therefore, the voltage Vg of the scanning line 6 fluctuates with the same amplitude as the voltage amplitude of the transparent conductive film.

As described above, with the sixth exemplary embodiment, the circuit within the pixel matrix part is set to be in a higher impedance state compared to the circuit on the outside in the position detecting period. Therefore, it is possible to achieve an effect of keeping a parasitic capacitance extremely small from the viewpoint of the transparent conductive film 12 side when the AC voltage is applied to the transparent conductive film, while achieving the same operational effects as those of the first exemplary embodiment. Specifically, while the parasitic capacitance with the related technique is 15 nF, for example, the parasitic capacitance can be reduced to as small as 100 pF with the use of the sixth exemplary embodiment.

As a result, with the use of the sixth exemplary embodiment, the S/N ratio of the signal outputted from the current detecting circuits 13 can be multiplied by 150 times ($6 \times 10^{-2}$, for example), whereas it is $4 \times 10^{-4}$, for example, with the related technique.

Further, both the gate voltage and the source voltage of the transistor change with the same amplitude as the voltage amplitude of the transparent conductive film. Thus, relative differences of the gate voltage and the source voltage can be made uniform, so that Vgs of the transistor is not fluctuated. This results in achieving such a special effect that it is possible to minimize the influence of the drive in the position detecting period imposed upon the image quality.

This exemplary embodiment uses the n-type TFTs for the high-impedance switch parts 16, 17, and 18 for making the inside and outside of the display area electrically high impedance. However, the high-impedance switch parts may be of p-type TFTs or may be a transfer gate formed with a combination of n-type and p-type.

Other structures, steps, functions, and operational effects thereof are the same as those of the above-described exemplary embodiment. Further, it is also possible to put the processing contents of the manufacturing device used for the method for manufacturing through each of the steps described above, the structural elements of each part (circuit), and each functions thereof into programs to have those programs executed by a computer.

Seventh Exemplary Embodiment

Figure 16:
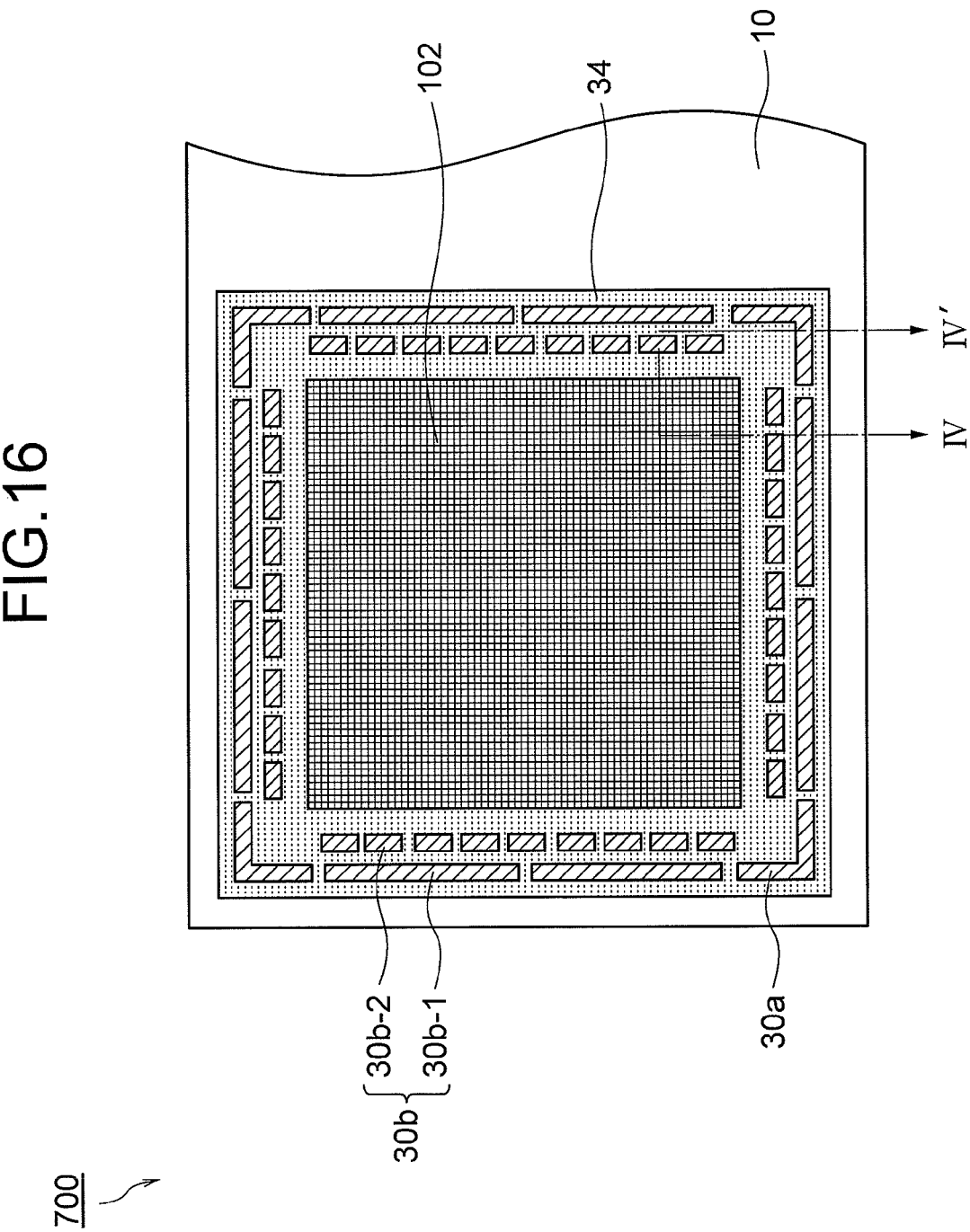
FIG. 16 is a plan model illustration showing an example of a schematic structure which illustrates a relation between linearization pattern sections and an anisotropic conductor of a display device according to a seventh exemplary embodiment of the invention.
Figure 17:
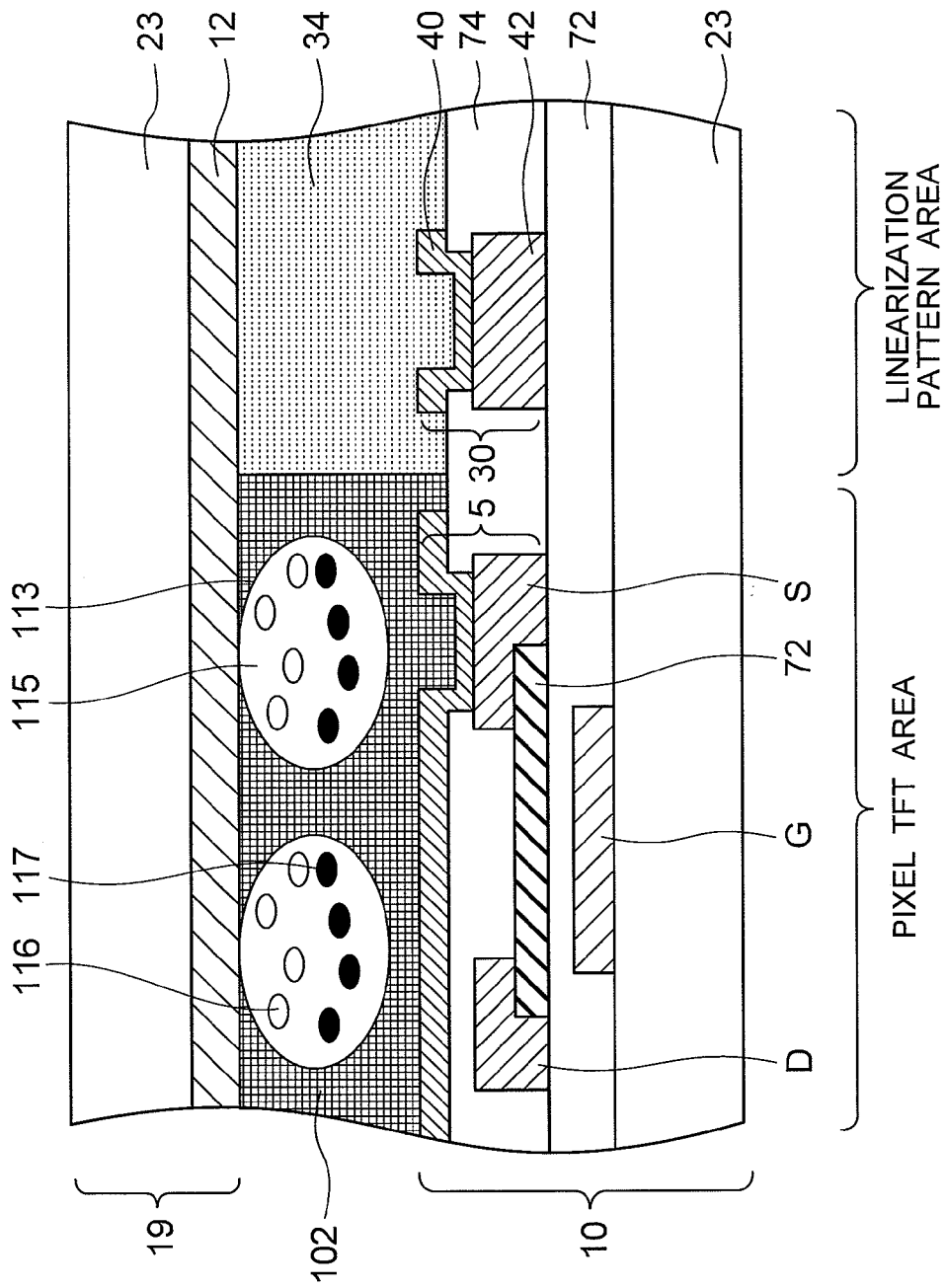
FIG. 17 is a fragmentary sectional view showing a IV-IV' part of FIG. 16.

Next, a seventh exemplary embodiment of the invention will be described by referring to FIG. 16 and FIG. 17. Hereinafter, the practically same structural elements as those of the first exemplary embodiment are omitted, and only different points will be described. FIG. 16 is a plan model illustration showing an example of a schematic structure which illustrates a relation between linearization pattern sections and an anisotropic conductor of a display device according to the seventh exemplary embodiment of the invention. FIG. 17 is a fragmentary sectional view showing a IV-IV' part of FIG. 16.

While the first exemplary embodiment shows the structural example of the liquid crystal display device, the seventh exemplary embodiment shows a structural example of an electrophoretic display device which utilizes micro-capsule type electrophoretic elements.

Specifically, as shown in FIG. 16 and FIG. 17, a display device 700 according to this exemplary embodiment is an electrophoretic display device (referred to as EPD hereinafter) which utilizes the micro-capsule type electrophoretic elements, and it is a monochromatic EPD active matrix display. The display device 700 has a counter substrate 19, an EPD film 102, and a display device substrate 10.

The counter substrate 19 has a counter electrode 12 made of a transparent conductive film formed on the inner-surface side of a transparent plastic substrate 23 formed with polyethylene terephthalate or the like, for example. The counter substrate 19 may be formed by using a glass substrate instead of the plastic substrate 23.

As shown in FIG. 17, the EPD film 102 is a film-type electrophoretic display device, which is configured with micro capsules 113 and a binder. The micro capsules 113 are filled inside the EPD film 102, and the size thereof is about 40 μm. A solvent 115 made with isopropyl alcohol (IPA) or the like is inserted inside the micro capsules 113, in which white particles 116 (titanium oxide based white pigment) in nano-level size and black particles 117 (carbon based black pigment) in nano-level size are dispersed to float in the solvent 115. The white particles 116 have minus (−) charged polarity, and the black particles 117 have plus (+) charged polarity. The binder is formed with polymer filed between the micro capsules 113 for coupling those to each other.

The display device substrate 10 has a structure in which TFTs are formed on the glass substrate 23. The TFT is an inverted staggered type in which gate G is arranged on the glass substrate 23 side with respect to source A and drain D.

Regarding the TFT, the gate G is formed on the glass substrate 23, an insulating film 72 to be a gate insulating film is formed on the gate G, a channel material 73 is formed on the insulating film 72, the source S and the drain D are formed on both outer sides of the channel material 73, an insulating film 74 is formed on the insulating film 72 including the channel material 73, the source S, and the drain D, a pixel electrode 5 is formed on the insulating film 74, and the pixel electrode 5 is via-connected to the source S.

In FIG. 16, the gate G of each TFT is electrically connected to the corresponding scanning line (not shown), and the drain D of each TFT is electrically connected to the corresponding signal line (not shown).

When a voltage is applied to the gate G, the + voltage applied to the drain D is supplied to the pixel electrode 5 through the channel material 73 and the source S. When the + voltage is supplied to the pixel electrode 5, the white particles 116 in the corresponding micro capsule 113 are drawn to the pixel electrode 5 side, and the black particles 117 in the micro capsule 113 are relatively drawn to the counter electrode 12.

In the meantime, when the − voltage is supplied to the pixel electrode 5, the black particles 117 in the corresponding micro capsule 113 are drawn to the pixel electrode 5 side, and the white particles 116 in the micro capsule 113 are relatively drawn to the counter electrode 12. In this manner, with the display device shown in FIG. 16, white and black images can be displayed on the counter electrode 12 side by supplying the + voltage or the − voltage to the pixel electrode 5.

In the seventh exemplary embodiment, the linearization pattern sections 30 formed on the display device substrate 10 are also covered by the anisotropic conductor 34, and the anisotropic conductor 34 is also in contact with the transparent conductive film 12. The display device substrate 10 and the transparent conductive film 12 are made conductive and the resistance in a specific area of the transparent conductive film 12 is reduced through electrically connecting the linearization pattern sections 30 on the display device substrate 10 and the transparent conductive film 12 via the anisotropic conductor 34.

Further, FIG. 16 shows the case where the linearization pattern sections 30a are extended from the vicinity of the four corners towards the centers of the respective neighboring sides on the four sides of the outer periphery of the display device substrate 10. However, it is also possible to provide the plurality of divided linearization pattern sections 30b on the four sides of the outer periphery of the display device substrate 10.

Further, a single-pole double-throw type switch is connected to the electrodes of the display device substrate 10. The current detecting circuit and the AC voltage source are connected in series to one of connections of the switch, and a COM terminal to which the counter electrode driving circuit is connected is connected to the other connection (not shown).

As in the case of the sixth exemplary embodiment (FIG. 14), the seventh exemplary embodiment may be structured in such a manner that: a signal line driving circuit for driving the signal liens and a scanning line driving circuit for driving the scanning lines are provided on the outer side of the display area; the switches are provided on the signal path between the scanning line and the signal path between the signal line and the signal driving circuit; and the wirings for transmitting the electric signals from the outside the display area to the inside are set to a high-impedance state.

Further, as in the case of the first exemplary embodiment, regarding its drive, the display device according to the seventh exemplary embodiment also has two periods such as a display drive period and a position detecting period. The display drive period is a period for writing a voltage for achieving pixel display. The position detecting period is a period where the current detecting circuit detects the electric current in order to detect coordinates of a finger position and to detect whether or not there is a pointing action. Those two periods are divided in terms of time.

As described above, the EPD of the seventh exemplary embodiment is capable of exhibiting a property which can keep a display for a long time after writing a voltage for the display, while achieving the same operational effects as those of the above-described exemplary embodiments. Thus, a larger proportion can be used for the position detecting period compared to the case of the LCD.

Further, it is possible to achieve a display device having a flexible characteristic and a touch sensor function through thinning the display device substrate 10 or transferring the pixel circuit to a flexible substrate.

Other structures, steps, functions, and operational effects thereof are the same as those of the above-described exemplary embodiment.

Other Various Modification Examples

While the device and the method according to the present invention have been described by referring to some of the specific exemplary embodiments, various modifications can be applied to the exemplary embodiments depicted in the contents of the present invention without departing from the technical spirit and the scope of the present invention.

For example, while each of the above exemplary embodiments has been described by referring to the cases of the liquid crystal display device or the electrophoretic display device, those exemplary embodiments surely can be applied to display devices of other types which utilize charged particles, an electro chromic material, an electro luminescence material (EL material), a gas, a semiconductor, a semiconductor, and a phosphor, for example.

Further, the number, positions, shapes and the like of the above-described structures are not limited to those described in the exemplary embodiments, but may be set to preferable number, positions, shapes, and the like for embodying the present invention. That is, while the exemplary embodiments have been described by referring to the case of having 6×4 numbers of dummy patterns among the linearization pattern sections, the present invention is not limited to such number.

Further, the linearization pattern sections are not limited to be formed in the geometrical shape as in the drawings. For example, the linearization pattern sections can be formed in a more complicated and fine form to improve the detection accuracy.

The liquid crystal display devices according to each of the above-described exemplary embodiments can be used as display units of various kinds of electronic apparatuses. Examples of the electronic apparatuses may include various kinds of electric products such as: various kinds of information processors such as a television set of the broadcast receiving device of the above-described exemplary embodiment, computers, and the like; remote controllers of various kinds of apparatuses; home appliances, game machines, and portable music players to which various kinds of information communicating functions are loaded; various kinds of recording devices; car navigation devices; pagers; electronic notebooks; pocket calculators; word processors; POS terminals; various kinds of mobile terminals; portable devices such as PDAs, portable telephones, wearable information terminals, PNDs, and PMPs; and display devices loaded on game machines such as pachinko machines.

Further, the display device substrate used as the first substrate to configure the display device may be considered as a target of the present invention.

In that case, the display device substrate according to the present invention can be used as the first substrate for configuring the display device which: displays an image by having display elements capable of performing electro-optic responses formed between the conductible first and second substrates; and are capable of detecting a contact position touched by a contact body by having a conductive impedance surface formed on the second substrate side.

The display device substrate can include: a pixel matrix part in which a plurality of pixels are formed in matrix; and linearization pattern sections including a plurality of electrodes formed in a peripheral area of the pixel matrix part, which are capable of performing linearization of electric fields of the conductive impedance surface and capable of detecting electric currents on the conductive impedance surface.

Further, the control circuit such as an external substrate for configuring the display device can be considered as a target of the present invention.

In that case, the control circuit of the display device of the present invention can be electrically connected to the display device which displays images by having the display device capable of performing electro-optic response formed between the conductible first and second substrates so as to perform a control to detect a contact position touched by a contact body by having the conductive impedance surface on the second substrate side.

The control circuit of the display device can include: a detecting device (current detecting circuit, etc.) for detecting the flowing electric currents at a plurality of points on the conductive impedance surface; and a detecting period switching control device which performs switching controls by dividing the detecting period for detecting the contact position to a first position detecting period for detecting the position in the first direction on the conductive impedance surface and to a second position detecting period for detecting the position in the second direction which crosses with the first direction.

Further, the control circuit of the display device can further include an impedance control device which can control the first circuit within the display area of the first substrate to be in electrically higher impedance compared to that of the second circuit part that is outside the display area, during the detecting period for detecting the contact position.

Furthermore, the manufacturing method of the display device substrate for configuring the display device (display device substrate manufacturing method) can also be considered as a target of the present invention.

In that case, the display device substrate manufacturing method can manufacture the display device substrate that can be used as the first substrate for configuring the display device which: displays an image by having display elements capable of performing electro-optic responses formed between the conductible first and second substrates; and are capable of detecting a contact position touched by a contact body by having a conductive impedance surface formed on the second substrate side.

The display device substrate manufacturing method can include: a first step which forms, on the first substrate, linearization pattern sections including a plurality of electrodes formed in a peripheral area of the pixel matrix part, which are capable of performing linearization of electric fields of the conductive impedance surface and capable of detecting electric currents on the conductive impedance surface.

The first step can be performed simultaneously with a step for forming the pixel electrode on the first substrate or a step for forming the wirings on the first substrate.

Further, a part of each block shown in the drawings or the control circuits that are not shown (the circuit for controlling the switches, the high-impedance switching control circuit, the current detection switching control circuits, etc.), the circuit configuring the position calculating part for calculating the position, etc. may be software module structures which are functionalized by various kinds of programs through executing such programs stored in a proper memory by a computer.

That is, even though the physical structure is a single or a plurality of CPU(s) (or a single or a plurality of CPU(s) and a single or a plurality of memory(s)) or the like, the software structure by each part (circuits, devices) can be considered a form in which a plurality of functions implemented by the CPU with controls of the programs are expressed as feature elements of each of the plurality of parts (devices).

When the dynamic state (each procedure configuring the program is being executed) where the CPU is executed by the program is expressed functionally, it can be expressed that each part (device) is built within the CPU.

In a static state where the program is not being executed, the entire program (or each program part included in the structure of each device) for achieving the structure of each device is stored in a storage area of the memory or the like.

Explanations of each part (device) provided above can be taken as the explanations of the computer that is functionalized by the program together with the functions of the program, or can be taken as a device that is configured with a plurality of electronic circuit blocks functionalized permanently by proper hardware. Therefore, those functional blocks can be achieved in various forms, e.g., only with hardware, only with software, or a combination of both, and it is not to be limited to any one of those forms.

Furthermore, the scope of the present invention is not limited to the examples shown in the drawings.

Moreover, each of the exemplary embodiments includes various stages, and various kinds of inventions can be derived therefrom by properly combining a plurality of feature elements disclosed therein. That is, the present invention includes combinations of each of the above-described exemplary embodiments or combinations of any of the exemplary embodiments and any of the modifications examples thereof. In that case, even though it is not specifically mentioned in the exemplary embodiments, the operational effects that are obvious from each structure disclosed in each of the exemplary embodiments and the modification examples thereof can naturally be included as the operational effects of the exemplary embodiments. Inversely, the structures that can provide all the operational effects depicted in the exemplary embodiments are not necessarily the essential feature elements of the substantial feature parts of the present invention. Furthermore, the present invention can include structures of other exemplary embodiments in which some of the feature elements are omitted from the entire feature elements of the above-described exemplary embodiments, as well as the technical scope of the structures based thereupon.

The descriptions regarding each of the exemplary embodiments including the modification examples thereof are presented merely as examples of various embodiments of the present invention (i.e., examples of concretive cases for embodying the present invention) for implementing easy understanding of the present invention. It is to be understood that those exemplary embodiments and the modification examples thereof are illustrative examples, and not intended to set any limitations therewith. The present invention can be modified and/or changed as appropriate. Further, the present invention can be embodied in various forms based upon the technical spirit or the main features thereof, and the technical scope of the present invention is not to be limited by the exemplary embodiments and the modification examples.

Therefore, each element disclosed above is to include all the possible design changes and the equivalents that fall within the technical scope of the present invention.

The present invention can be applied to display devices in general. More specifically, as away of application examples, the present invention can be applied to display devices which are used for game machines, portable information terminals, ticket-vending machines, automated teller machines (ATM), car navigation systems, TV game machines provided at passengers seats of airplanes or buses, factory automation (FA) equipment, printers, facsimile machines, etc.

What is claimed is:

1. A display device which displays an image, the display device configured to include an electro-optic material between a thin film transistor substrate on which a thin film transistor is formed and a counter substrate, wherein
   linearization pattern sections and a pixel area in which a plurality of pixel electrodes for supplying electric signals to the electro-optic material are formed on the thin film transistor substrate,
   the counter substrate includes a counter electrode,
   an anisotropic conductor is arranged at least at a part of a peripheral area of the pixel area between the thin film transistor substrate and the counter substrate, and
   the linearization pattern sections, the anisotropic conductor, and the counter electrode are sequentially arranged from bottom to top in this order, and the anisotropic conductor electrically connects the linearization pattern sections with the counter electrode.

2. The display device as claimed in claim 1, wherein the conductive member is interposed between the thin film semiconductor substrate and the counter substrate to also work as a sealing device for sealing the electro-optic material.

3. The display device as claimed in claim 1, wherein the anisotropic conductor is formed by being divided into a plurality of pieces.

4. The display device as claimed in claim 1, wherein:
   a first linearization pattern section is formed to extend from a corner of the thin film semiconductor substrate towards side areas in a range from the corner to vicinity of centers of the sides.

5. The display device as claimed in claim 4, wherein:
   a second linearization pattern section has a plurality of layers of conductive films which configure pixels or a peripheral circuit formed on the thin film semiconductor substrate, and an interlayer insulating film between the plurality of conductive films; and
   no contact hole is formed in the interlayer insulating film.

6. The display device as claimed in claim 1, comprising a detecting period switching control device which performs switching controls when detecting positions in each direction, by dividing a detecting period for detecting a contact position to a first position detecting period for detecting a position in a first direction on a conductive impedance surface on the counter substrate and to a second position detecting period for detecting a position in a second direction which crosses with the first direction.

7. The display device as claimed in claim 1, further comprising an impedance control device which can control a first circuit part within a display area of the thin film semiconductor substrate to be in electrically higher impedance compared to that of a second circuit part that is outside the display area and control the first circuit part and the second circuit part to be in a non-conductive state, during a detecting period for detecting a contact position.

8. The display device as claimed in claim 7, wherein the impedance control device includes:
   a switch part formed on wirings which connect the first circuit part with the second circuit part; and
   a control circuit which performs on/off controls of the switch part.

9. The display device of claim 1, wherein the display device is further configured to include display means for displaying an image by a plurality of display elements provided between the thin film transistor substrate and a second substrate, comprising:
   thin film transistor substrate in which the linearization pattern sections, a control part of the display elements, and wirings are formed;
   the second substrate which opposes against the linearization pattern sections, has a conductive impedance surface formed thereon, and measures, at a plurality of points, electric current values flown at a contact point touched by a contact body to detect a contact position; and
   conductive means for electrically connecting the linearization pattern sections and the conductive impedance surface.

10. The display device as claimed in claim 1, wherein a pattern of the anisotropic conductor covers an entirety of the linearization pattern sections.

11. The display device as claimed in claim 1, wherein a pattern of the anisotropic conductor is formed in a frame shape.

12. The display device as claimed in claim 1, wherein the linearization pattern sections are configured with stacked layers of a plurality of conductive layers on the thin film transistor substrate.

13. The display device as claimed in claim 1, wherein the linearization pattern sections have a conductive layer forming a signal line on the thin film transistor substrate or a conductive layer forming the plurality of pixel electrodes.

14. An electronic apparatus, comprising the display device claimed in any one of claims 1 to 13 loaded thereon.

15. The display device as claimed in claim 1, further comprising a current detecting circuit configured to detect a current flown in the counter electrode via the anisotropic conductor and the linearization pattern sections.

16. The display device as claimed in claim 15, further comprising an AC voltage source configured to supply AC voltages to the counter electrode via the anisotropic conductor and the linearization pattern sections.

17. A manufacturing method of a display device that displays an image, the display device configured to include an electro-optic material between a thin film transistor substrate on which a thin film transistor is formed and a counter substrate, the method comprising: a first step of forming a pixel area in which a plurality of pixel electrodes that supply electric signals to the electro-optic material are arranged, and simultaneously forming linearization pattern sections on the thin film transistor substrate; a second step of forming an counter electrode on the counter substrate; and a third step of arranging an anisotropic conductor at least at a part of a peripheral area of the pixel area between the thin film transistor substrate and the counter substrate, wherein the linearization pattern sections, the anisotropic conductor, and the counter electrode are sequentially arranged from bottom to top in this order.

18. The manufacturing method as claimed in claim 17, wherein the first step includes photolithography or etching.

* * * * *